US012742482B2

(12) United States Patent
Matsubara et al.

(10) Patent No.: US 12,742,482 B2
(45) Date of Patent: Sep. 22, 2026

(54) DISC BRAKE DEVICE AND METHOD FOR ASSEMBLING SAME

(71) Applicant: AKEBONO BRAKE INDUSTRY CO., LTD., Tokyo (JP)

(72) Inventors: Ken Matsubara, Tokyo (JP); Yuta Yamaguchi, Tokyo (JP); Makoto Morimoto, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 442 days.

(21) Appl. No.: 18/239,963

(22) Filed: Aug. 30, 2023

(65) Prior Publication Data

US 2024/0077120 A1 Mar. 7, 2024

(30) Foreign Application Priority Data

Sep. 5, 2022 (JP) ................................ 2022-140580

(51) Int. Cl.
*F16D 55/226* (2006.01)
*B60T 13/74* (2006.01)
(Continued)

(52) U.S. Cl.
CPC .......... *F16D 55/226* (2013.01); *B60T 13/746* (2013.01); *F16D 65/183* (2013.01);
(Continued)

(58) Field of Classification Search
CPC ...... B50T 13/74; B50T 13/746; B50T 13/741; F16D 55/226; F16D 55/22655;
(Continued)

(56) References Cited

U.S. PATENT DOCUMENTS

2007/0029143 A1* 2/2007 Adachi ................. B60T 13/741 188/162
2007/0034459 A1* 2/2007 Matsushita ............. B60T 13/74 188/72.6

(Continued)

FOREIGN PATENT DOCUMENTS

JP 2020-118166 A 8/2020
WO WO-2022019245 A1 * 1/2022 ............ B60T 13/588

*Primary Examiner* — Robert A. Siconolfi
*Assistant Examiner* — San M Aung
(74) *Attorney, Agent, or Firm* — Faegre Drinker Biddle & Reath LLP

(57) ABSTRACT

There is provided a disc brake device in which a plurality of annular seals that are disposed coaxially with rotation members, in which the annular seals are sandwiched in an axial direction between a caliper and a housing, and in which a position restriction portion includes: at least one caliper-side restriction portion provided on the caliper, which is disposed non-coaxially with the rotation member and is configured to serve as a reference of a position of the rotation member; and at least one housing-side restriction portion provided on the housing, which is disposed non-coaxially with an output member and is configured to serve as a reference of a position of the output member, and is configured to restrict a position of the housing with respect to the caliper by bringing the caliper-side restriction portion and the housing-side restriction portion into contact with each other.

15 Claims, 21 Drawing Sheets

(51) Int. Cl.

| | |
|---|---|
| ***F16D 65/18*** | (2006.01) |
| ***F16D 121/24*** | (2012.01) |
| ***F16D 125/40*** | (2012.01) |
| ***F16D 125/48*** | (2012.01) |

(52) U.S. Cl.
CPC ...... *F16D 2121/24* (2013.01); *F16D 2125/40* (2013.01); *F16D 2125/48* (2013.01); *F16D 2250/0084* (2013.01)

(58) Field of Classification Search
CPC ...... F16D 65/18; F16D 65/183; F16D 65/227; F16D 2121/24; F16D 2125/50; F16D 2125/40; F16D 2125/48; F16D 2250/0084
USPC .......................................................... 188/72.8
See application file for complete search history.

(56) References Cited

U.S. PATENT DOCUMENTS

2007/0209888 A1* 9/2007 Adachi ................... F16D 65/18 188/162
2008/0264735 A1* 10/2008 Matsushita ............. F16D 65/18 188/68
2019/0120310 A1* 4/2019 Al-Mahshi .............. F16D 55/22
2020/0141456 A1* 5/2020 Zenzen ................... B60T 11/10
2020/0309214 A1 10/2020 Al-Mahshi et al.
2021/0001826 A1* 1/2021 Gerber .................. B60T 13/741
2021/0262539 A1* 8/2021 Yu ........................... F16D 65/18
2023/0286480 A1* 9/2023 Kato ....................... B60T 1/065

* cited by examiner

CIRCUMFERENTIAL DIRECTION
ONE SIDE
OTHER SIDE
RADIAL DIRECTION
OUTER SIDE
INNER SIDE
A
A
1
2
5
8
9
10a
12
13
14a
14b
15
15
17
20
28a
28b
48
74a
74b 1
2
5
8
9
10b
12
14a
14b
15
17
21a
21b
22a
22b
48
74c
CIRCUMFERENTIAL DIRECTION
ONE SIDE
OTHER SIDE
RADIAL DIRECTION
OUTER SIDE
INNER SIDE

OTHER SIDE
CIRCUMFERENTIAL DIRECTION
ONE SIDE
71b
66
25
71a
5
48
28b
28a
74a
8
74b
22b
21b
18b
19
21a
22a
1
18a
INNER SIDE
AXIAL DIRECTION
OUTER SIDE
11
14b
2
9
14a
10b
16
20
13

1
5
48
46
55d
51a
52a
24a
25
6a
23a
37a
38a
19
22a
21a
4a
18a
3a
2
14a
9
16
17
36a
10a
10b
20
16
17
36b
54
51b
55e
52b
24b
6b
23b
22b
21b
37b
38b
4b
18b
3b
14b
CIRCUMFERENTIAL DIRECTION
ONE SIDE
OTHER SIDE
AXIAL DIRECTION
INNER SIDE
OUTER SIDE 5
48
41a
24a
67a
26a
6a
27a
23a
40a
43a
42a
38a
2
19
18a
3a
52a
46
51a
25
68a
66
68b
51b
52b
41b
24b
67b
26b
6b
27b
23b
40b
43b
42b
38b
18b
3b
35a
36a
4a
39a
37a
44a
44b
37b
39b
36b
4b
35b

CIRCUMFERENTIAL DIRECTION
ONE SIDE
OTHER SIDE
RADIAL DIRECTION
OUTER SIDE
INNER SIDE
2
9
12
14a
14b
15
18a
18b
19
21a
21b
22a
22b
23a
23b
25
26a
26b
27a
27b
28a
28b
28c
29a
29b
30
31
32
34a
34b
36a
36b
10b
$O_A$
$O_{18}$ 2
32
34b
14b
9
12
15
19
33
28b
29b
25
33
28a
29a
34a
31
22a
27a
23a
36a
41a
28c
26b
30
36b
41b
26b
27b
23b
22b
21b 47
55b
63
51a
55c
45
49
55c
56b
55a
64b
60
54
52a
64a
55e
53
57
50
56a
58
59
52b
51b
46

*FIG. 20*
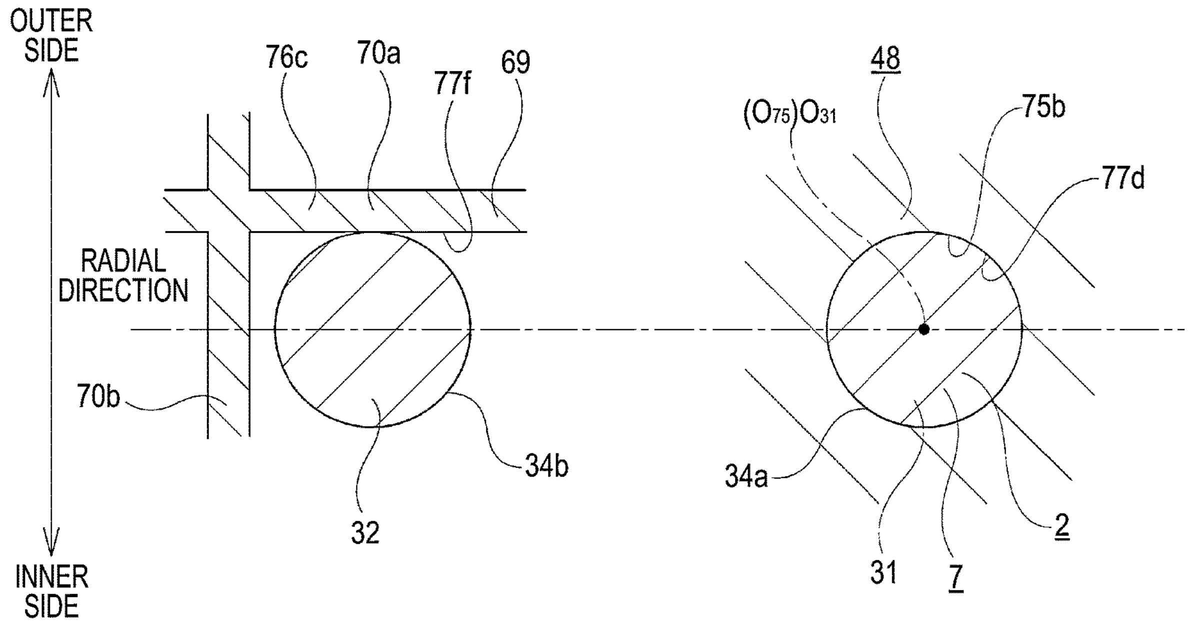
*FIG. 21*
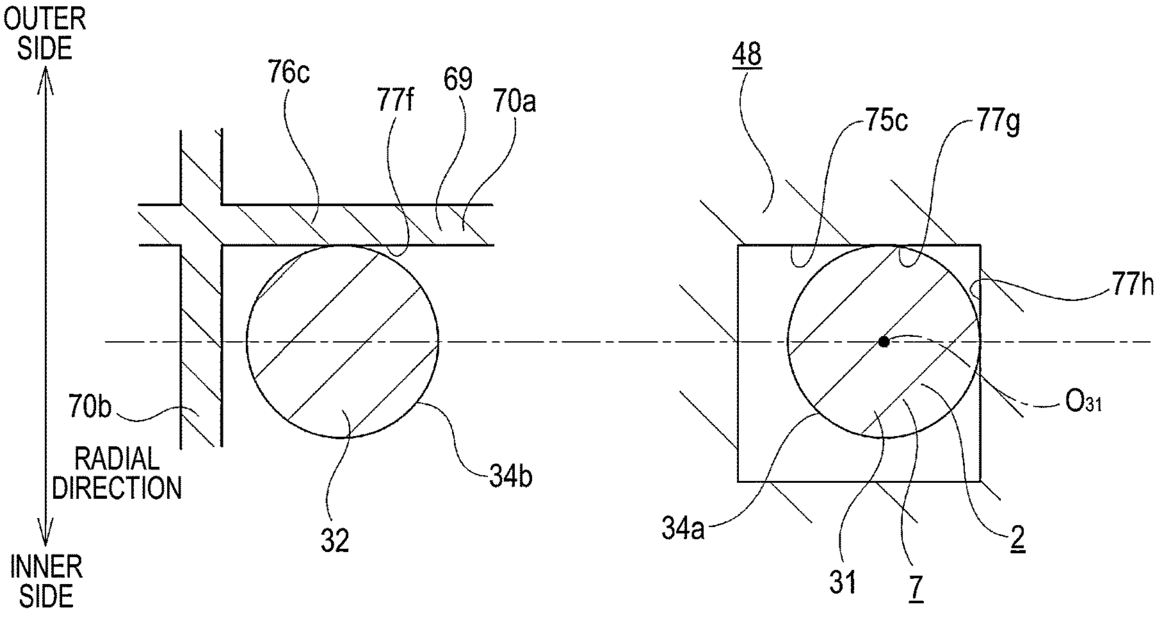

INNER SIDE
AXIAL DIRECTION
OUTER SIDE
100
101
102
103a
103b
104
105
106
107
108
109
110
111
112
113
114
115

DISC BRAKE DEVICE AND METHOD FOR ASSEMBLING SAME

CROSS-REFERENCE TO RELATED APPLICATIONS

This application is based on Japanese Patent Application No. 2022-140580 filed on Sep. 5, 2022, the contents of which are incorporated herein by way of reference.

TECHNICAL FIELD

The present disclosure relates to a disc brake device and a method for assembling the same.

BACKGROUND

There are increasing cases where a disc brake device is adopted not only for front wheels but also for rear wheels of an automobile because the disc brake device is excellent in heat dissipation and a braking force during traveling can be finely adjusted.

Disc brake devices can be roughly divided into hydraulic disc brake devices that use hydraulic oil to obtain a braking force and electric disc brake devices that use an electrically drivable actuator to obtain a braking force.

As disclosed in JP2020-118166A (Patent Literature 1) and the like, as an electric disc brake device, there is an electric parking brake structure in which a braking force caused by a service brake is generated by feeding brake oil (fluid) into a cylinder, and a braking force caused by a parking brake is generated by driving an electric actuator such as a rotation-linear motion conversion mechanism by an electric motor.

FIG. 26 illustrates an electric parking disc brake device 100 disclosed in JP2020-118166A.

The disc brake device 100 is a floating-type disc brake device, and includes a support 101 fixed to a suspension device, and a caliper 102 supported so as to be movable in an axial direction of a rotor (not illustrated) with respect to the support 101.

Each of an outer pad 103*a* and an inner pad 103*b* is supported by the support 101 so as to be movable in the axial direction of the rotor.

The caliper 102 includes a cylinder 104. A piston 105 is fitted into an inner side of the cylinder 104.

A rotation-linear motion conversion mechanism 106 that presses the piston 105 when a braking force caused by the parking brake is obtained is disposed in an inner side of the piston 105. The rotation-linear motion conversion mechanism 106 includes a spindle 107 as a rotation member and a nut 108 as a linear motion member. The rotation-linear motion conversion mechanism 106 is driven by the motor gear unit 109.

The motor gear unit 109 includes a housing 110, an electric motor (not illustrated), and an output shaft 111.

The housing 110 is fixed to the caliper 102 by bolts (not illustrated), and accommodates the electric motor, the output shaft 111, and the like.

The output shaft 111 is disposed coaxially with the spindle 107 constituting the rotation-linear motion conversion mechanism 106, and is connected to an end portion of the spindle 107 in a torque transmittable manner. A final gear constituting a deceleration mechanism such as a gear type reduction gear is fixed to the output shaft 111. Therefore, the output shaft 111 is rotationally driven by the electric motor to transmit rotation of the electric motor to the spindle 107.

Sealing is performed between the caliper 102 and the housing 110 by an O-ring 112. The O-ring 112 is disposed in a spigot-fitting portion 113 between the caliper 102 and the housing 110. Specifically, the O-ring 112 is sandwiched between an outer peripheral surface of a fitting shaft portion 114 provided in the caliper 102 and an inner peripheral surface of a fitting hole portion 115 provided in the housing 110 in a radial direction of the spigot-fitting portion 113.

In the disc brake device 100 of an existing structure, the fitting shaft portion 114 and the spindle 107 are coaxially disposed, and the fitting hole portion 115 and the output shaft 111 are coaxially disposed. As a result, by spigot-fitting the fitting shaft portion 114 and the fitting hole portion 115, positioning of the housing 110 with respect to the caliper 102 is performed, and coaxiality between the spindle 107 and the output shaft 111 is ensured.

When the service brake is caused to operate by the disc brake device 100 of the existing structure, the brake oil is fed to the cylinder 104 provided in the caliper 102 through an oil passage (not illustrated). As a result, the piston 105 is pushed out from the cylinder 104 and the inner pad 103*b* is pressed against an inner surface of the rotor. In addition, the caliper 102 is displaced toward an inner side with respect to the support 101 in the axial direction of the rotor by a reaction force caused by the pressing. Further, the outer pad 103*a* is pressed against an outer surface of the rotor by the caliper 102. As a result, a braking force is obtained by friction applied to contact surfaces of the outer pad 103*a* and the inner pad 103*b* with the rotor.

On the other hand, in order to cause the parking brake to operate by the disc brake device 100, the electric motor is rotationally driven in a predetermined direction to rotate the output shaft 111. When rotation is transmitted to the output shaft 111, the piston 105 is pushed out toward the rotor via the rotation-linear motion conversion mechanism 106 to press the inner pad 103*b* against the inner surface of the rotor. In addition, the caliper 102 is displaced toward an inner side with respect to the support 101 in the axial direction of the rotor by a reaction force caused by the pressing. Further, the outer pad 103*a* is pressed against an outer surface of the rotor by the caliper 102. As a result, a braking force caused by the parking brake is obtained by friction applied to the contact surfaces of the outer pad 103*a* and the inner pad 103*b* with the rotor.

Patent Literature 1: JP2020-118166A

Patent Literature 2: U.S. Patent Application Publication No. 2020/0309214

As disclosed in U.S. Patent Application Publication No. 2020/0309214 (Patent Literature 2), in an electric parking disc brake device mounted on a large vehicle such as a truck or a commercial vehicle, in order to obtain a large braking force, a pad is simultaneously pressed by a plurality of pistons.

In the electric parking disc brake device having a configuration in which a pad is simultaneously pressed by a plurality of pistons, rotation members constituting a rotation-linear motion conversion mechanism disposed on an inner side of each of a plurality of cylinders and a plurality of output members accommodated in a housing of a motor gear unit need to be disposed coaxially with each other and connected to each other in a torque transmittable manner.

In order to coaxially dispose the plurality of rotation members and the plurality of output members, it is conceivable to use a spigot-fitting portion as in the existing structure disclosed in JP2020-118166A. Specifically, it is conceivable that the same number of spigot-fitting portions as the number of the rotation members and the output members are provided, and for each spigot-fitting portion, a fitting shaft portion and a rotation member are coaxially disposed, and a fitting hole portion and an output member are coaxially disposed.

However, when a plurality of spigot-fitting portions are provided, it is difficult to strictly match a size of a clearance between an outer peripheral surface of the fitting shaft portion and an inner peripheral surface of the fitting hole portion in all the spigot-fitting portions. Therefore, positioning of the housing with respect to the caliper is performed based on a spigot-fitting portion having the smallest clearance. Accordingly, it is possible to ensure the coaxiality between the rotation member and the output member whose positions are restricted with reference to the spigot-fitting portion having the smallest clearance, but it is difficult to ensure the coaxiality between the rotation member and the output member whose positions are restricted with reference to another spigot-fitting portion. As a result, there is a possibility of causing a problem such as a reduction in conversion efficiency of the rotation-linear motion conversion mechanism.

In a case where a configuration in which an O-ring is sandwiched in the radial direction of the spigot-fitting portion is adopted for each of the plurality of spigot-fitting portions, it is difficult to make interference of the O-ring uniform over the entire circumference for the spigot-fitting portions other than the spigot-fitting portion having the smallest clearance. Therefore, it is difficult to ensure sealing performance between the caliper and the housing.

The present disclosure has been made to solve the above problem, and an object thereof is to provide a disc brake device capable of ensuring coaxiality between a plurality of rotation members and a plurality of output members and capable of ensuring sealing performance between a caliper and a housing.

SUMMARY

A disc brake device according to an aspect of the present disclosure includes a caliper, a plurality of pistons, a plurality of rotation-linear motion conversion mechanisms, a motor gear unit, a plurality of annular seals, a position restriction portion, and a fixing portion.

The caliper has a plurality of cylinders on an inner side in an axial direction with respect to a rotor.

The plurality of pistons are fitted into the plurality of cylinders, respectively. The plurality of rotation-linear motion conversion mechanisms are disposed in the plurality of cylinders, configured to push out each of the plurality of pistons toward the rotor by converting a rotational motion into a linear motion, and include rotation members and linear motion members.

The motor gear unit is supported and fixed to the caliper and includes an electric motor, a plurality of output members disposed coaxially with the rotation members and configured to transmit rotation of the electric motor to the rotation members, the number of which is the same as the number of the rotation members, and a housing accommodating the electric motor and the plurality of output members.

The plurality of annular seals are provided in the same number as the number of the rotation members, are disposed coaxially with the rotation members, and configured to perform sealing between the caliper and the housing.

The position restriction portion is configured to restrict a position of the motor gear unit with respect to the caliper.

The fixing portion is configured to fix the caliper and the housing.

In the disc brake device according to the aspect of the present disclosure, the annular seals are sandwiched in the axial direction between the caliper and the housing.

The position restriction portion includes: at least one caliper-side restriction portion provided on the caliper, which is disposed non-coaxially with the rotation member and is configured to serve as a reference of a position of the rotation member: and at least one housing-side restriction portion provided on the housing, which is disposed non-coaxially with the output member and is configured to serve as a reference of a position of the output member, and is configured to restrict a position of the housing with respect to the caliper by bringing the caliper-side restriction portion and the housing-side restriction portion into contact with each other.

In the disc brake device according to the aspect of the present disclosure, the caliper-side restriction portion may include at least one caliper-side restriction surface having a curved surface shape or a flat surface shape, and the housing-side restriction portion may include at least one housing-side restriction surface having a curved surface shape or a flat surface shape.

The caliper-side restriction portion and the housing-side restriction portion can be brought into contact with each other by the caliper-side restriction surface and the housing-side restriction surface.

In the disc brake device according to the aspect of the present disclosure, one of the caliper-side restriction portion and the housing-side restriction portion may include at least one restriction corner portion, and the other of the caliper-side restriction portion and the housing-side restriction portion may include at least one restriction surface having a curved surface shape or a flat surface shape.

The caliper-side restriction portion and the housing-side restriction portion can be brought into contact with each other by the restriction corner portion and the restriction surface.

In the disc brake device according to the aspect of the present disclosure, the caliper-side restriction portion and the housing-side restriction portion may be provided in two each.

In the disc brake device according to the aspect of the present disclosure, by bringing a first caliper-side restriction portion of the two caliper-side restriction portions into contact with a first housing-side restriction portion of the two housing-side restriction portions, a circumferential position and a radial position of each of the first caliper-side restriction portion and the first housing-side restriction portion may be restricted, and by bringing a second caliper-side restriction portion of the two caliper-side restriction portions into contact with a second housing-side restriction portion of the two housing-side restriction portions, a relative rotation position between the caliper and the housing about a central axis of the first caliper-side restriction portion or the first housing-side restriction portion may be restricted.

In the disc brake device according to the aspect of the present disclosure, a contact direction of the second caliper-side restriction portion and the second housing-side restriction portion may be a circumferential direction or a radial direction.

In the disc brake device according to the aspect of the present disclosure, the caliper-side restriction portion may have a convex shape protruding in the axial direction.

In this case, the caliper-side restriction portion may be formed separately from the caliper, and may include a pin member configured to be fixed to the caliper.

Further, when the caliper-side restriction portion is formed separately from the caliper, the caliper-side restriction portion may be sandwiched and disposed between the caliper and the housing in the axial direction.

In the disc brake device according to the aspect of the present disclosure, the housing-side restriction portion may be formed integrally with the housing.

In this case, the housing-side restriction portion may be provided in a part of a reinforcing rib integrally formed with the housing.

In addition, when the housing-side restriction portion is integrally formed with the housing, the housing-side restriction portion may have a concave shape recessed in the axial direction.

In the disc brake device according to the aspect of the present disclosure, the housing-side restriction portion may be formed separately from the housing and may include a pin member configured to be molded and fixed to the housing.

In the disc brake device according to the aspect of the present disclosure, the fixing portion may be a bolt.

A method for assembling the disc brake device according to the aspect of the present disclosure includes a process of, when the disc brake device according to the aspect of the present disclosure is to be assembled, bringing the caliper-side restriction portion and the housing-side restriction portion into contact with each other by utilizing gravity applied to the housing or the caliper.

A method for assembling the disc brake device according to the aspect of the present disclosure includes a process of, when the disc brake device according to the aspect of the present disclosure in which a bolt is adopted as the fixing portion is to be assembled, bringing the caliper-side restriction portion and the housing-side restriction portion into contact with each other by utilizing a rotational force applied to the housing or the caliper from the bolt when tightening the bolt.

BRIEF DESCRIPTION OF DRAWINGS

FIG. 20 is a view corresponding to FIG. 16, illustrating a fifth example of the embodiment.

FIG. 21 is a view corresponding to FIG. 16, illustrating a sixth example of the embodiment.

DESCRIPTION OF EMBODIMENTS

First Example of Embodiment

Figure 1:
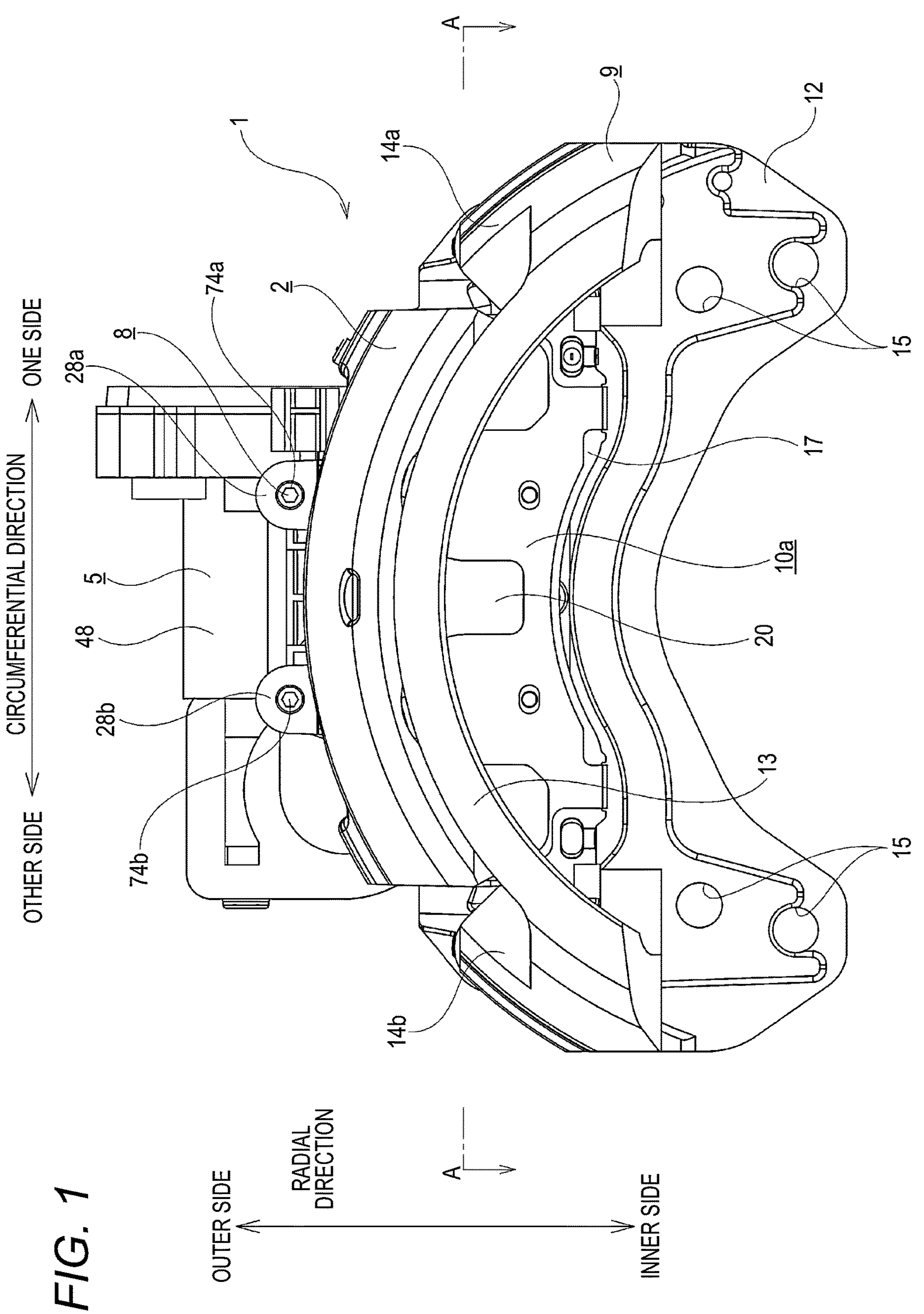
FIG. 1 is a front view of a disc brake device according to a first example of an embodiment as viewed from an outer side (outer side of a vehicle body) in an axial direction.
Figure 2:
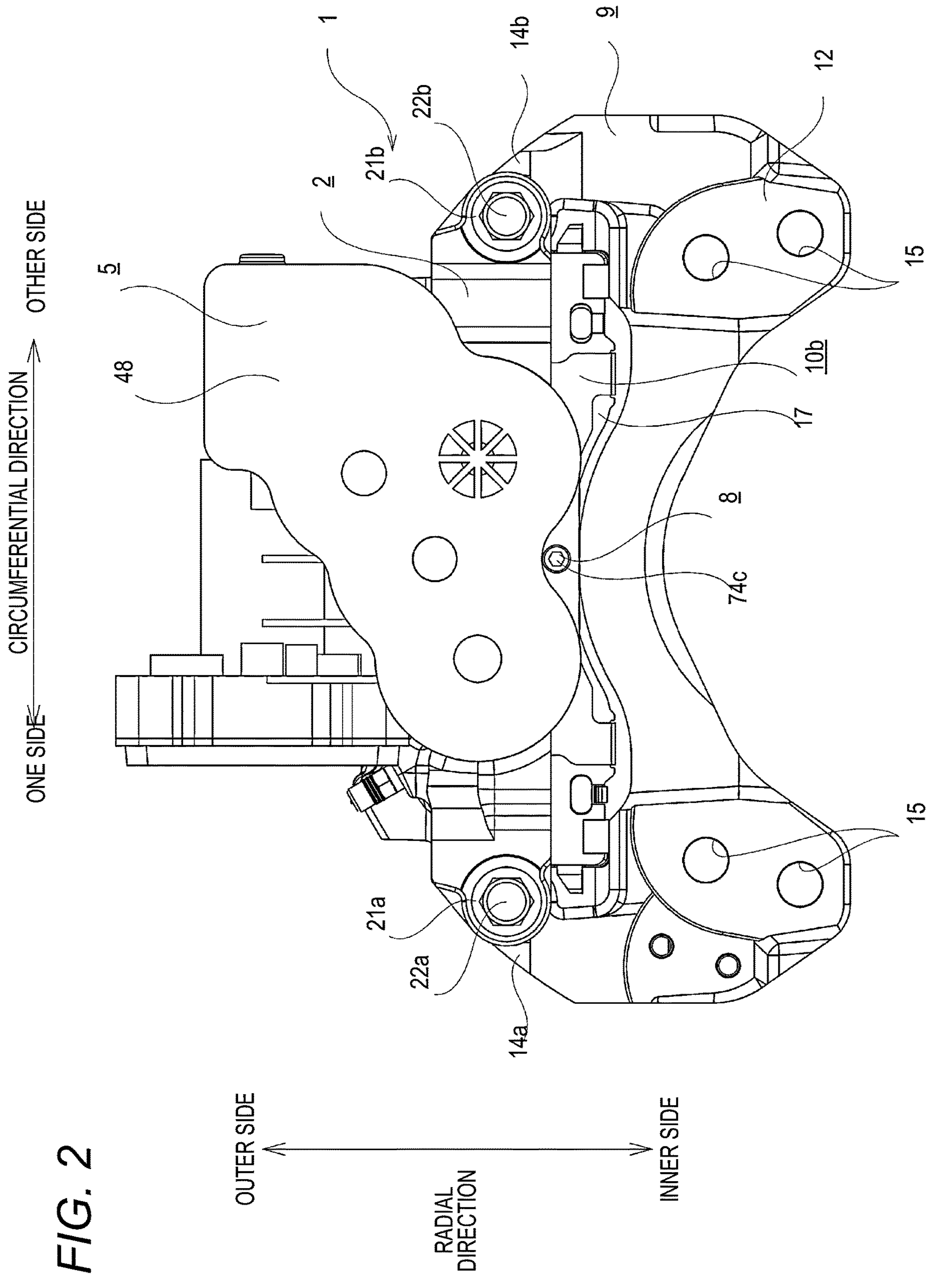
FIG. 2 is a rear view of the disc brake device according to the first example of the embodiment as viewed from an inner side (center side of the vehicle body) in the axial direction.
Figure 3:
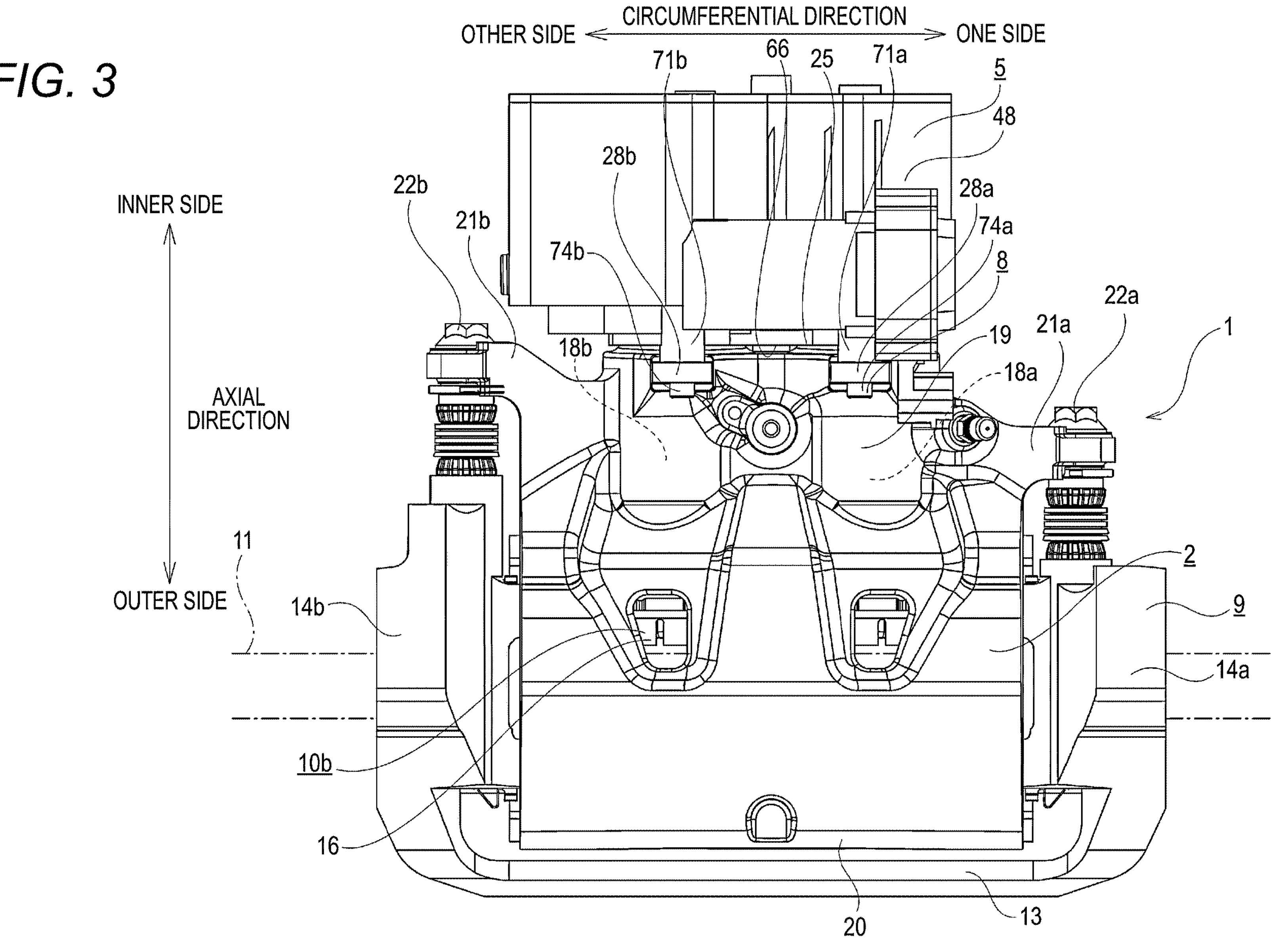
FIG. 3 is a plan view of the disc brake device according to the first example of the embodiment as viewed from an outer side in a radial direction.
Figure 4:
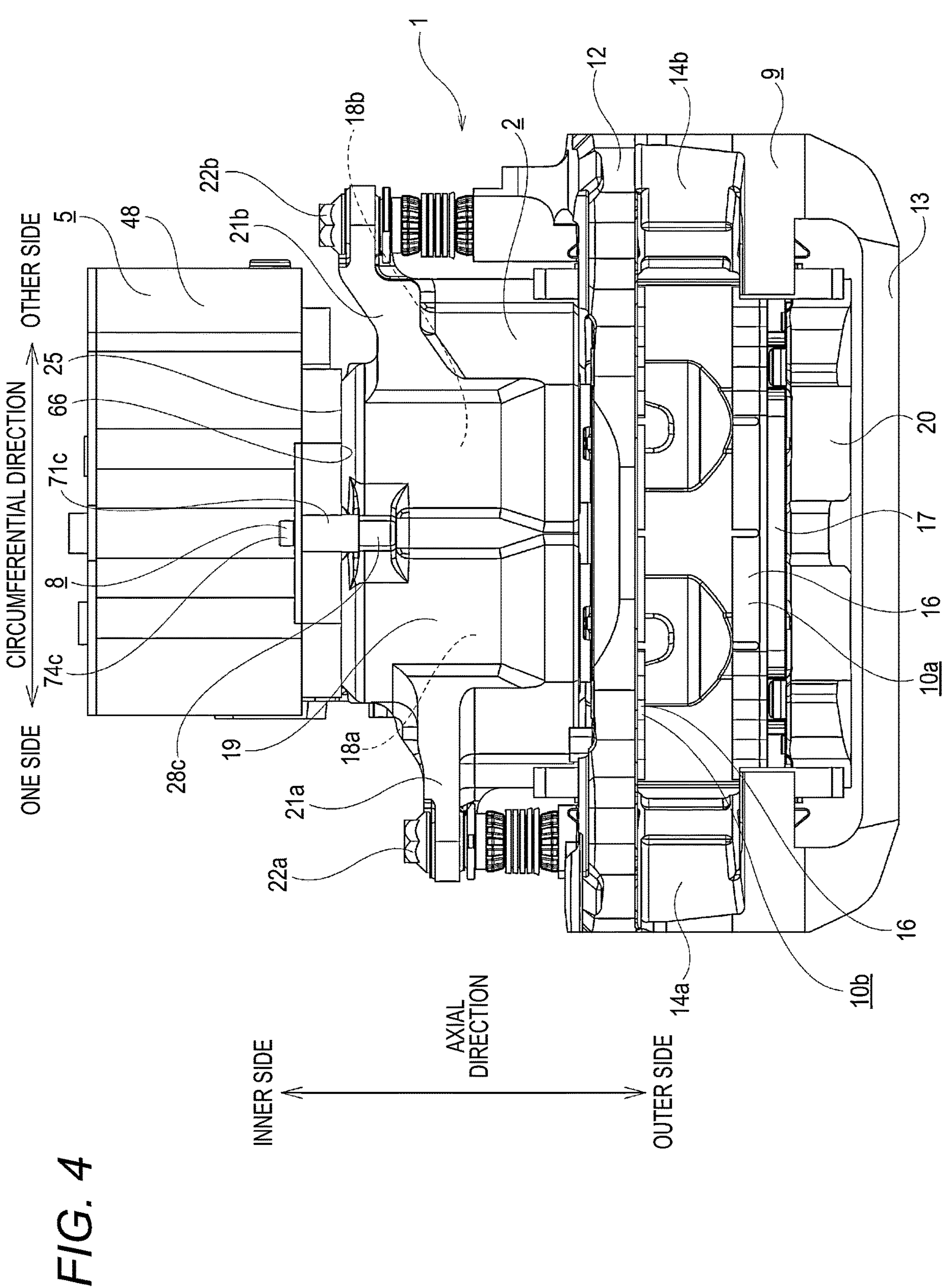
FIG. 4 is a bottom view of the disc brake device according to the first example of the embodiment as viewed from an inner side in the radial direction.
Figure 5:
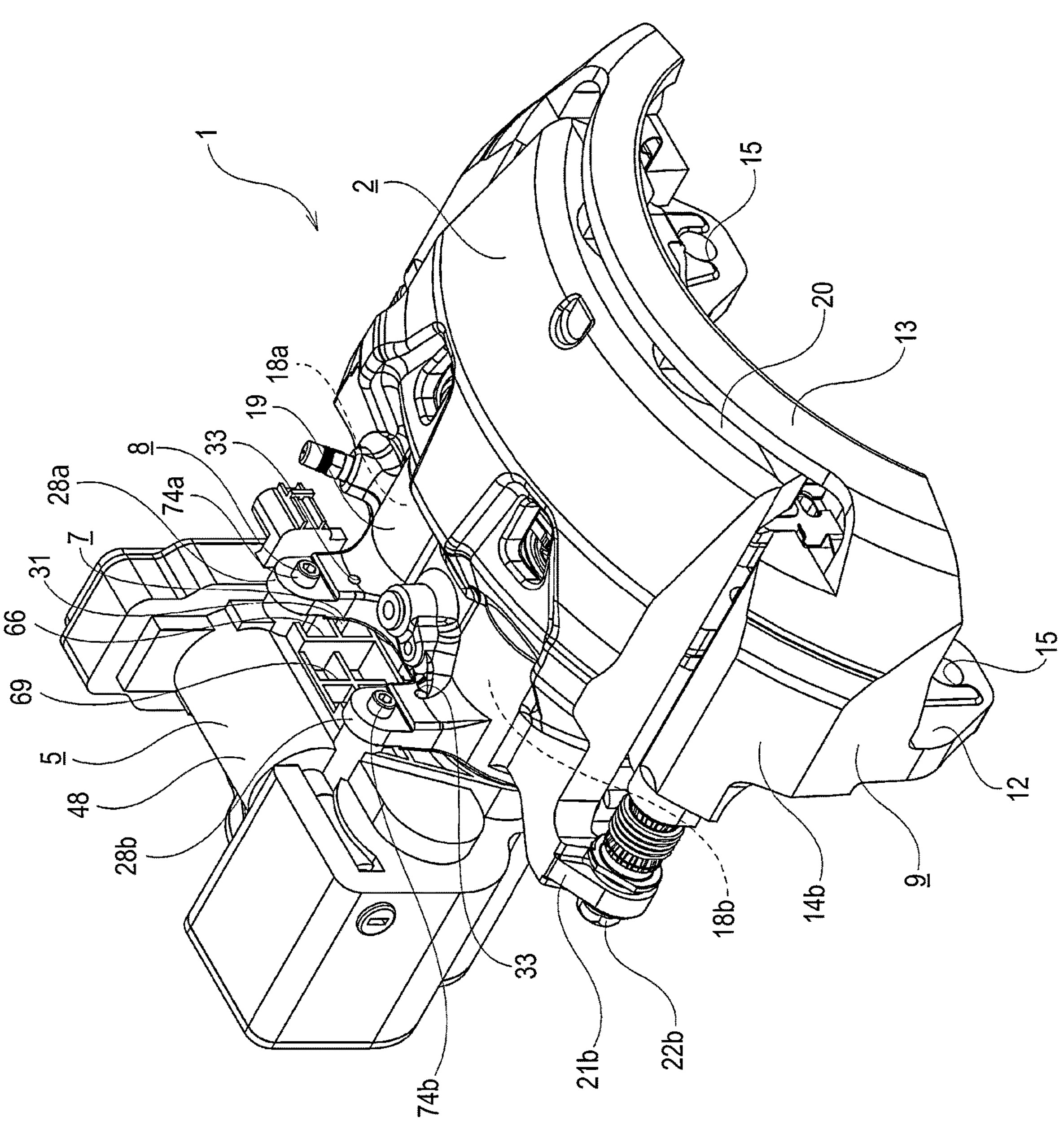
FIG. 5 is a perspective view of the disc brake device according to the first example of the embodiment as viewed from the outer side in the axial direction and the outer side in the radial direction.
Figure 6:
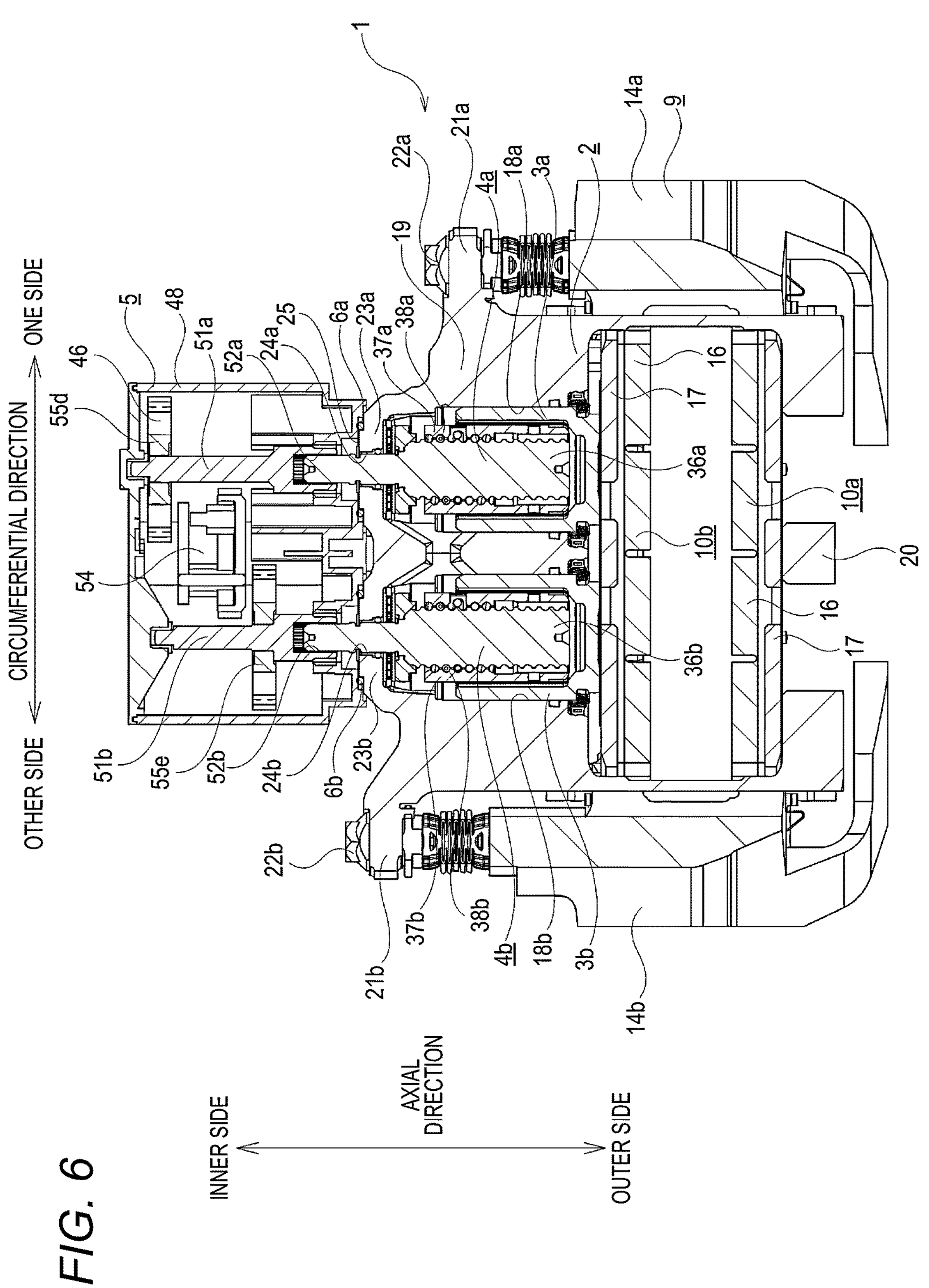
FIG. 6 is a cross-sectional view taken along a line A-A in FIG. 1.
Figure 7:
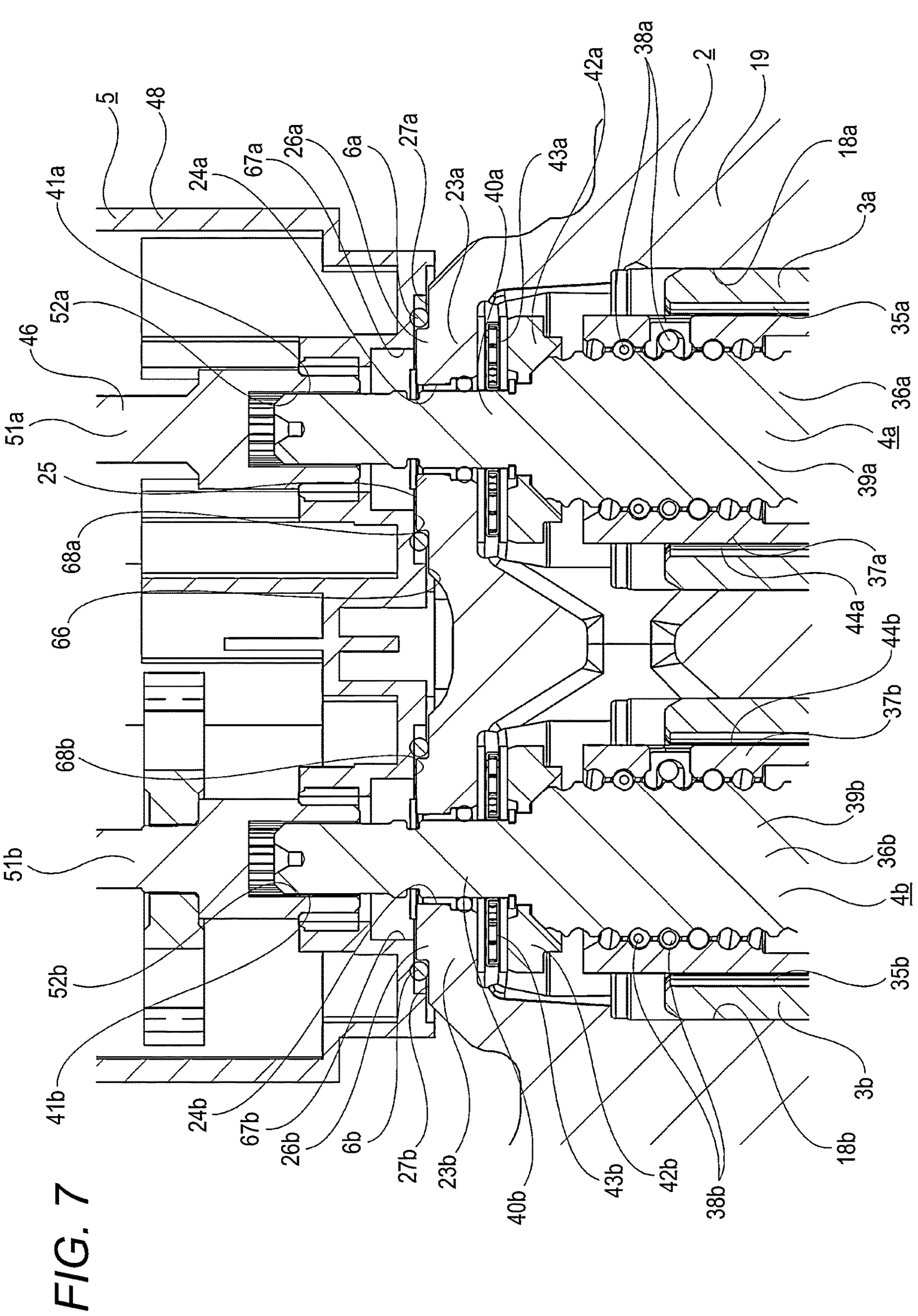
FIG. 7 is a partial enlarged view of FIG. 6.
Figure 8:
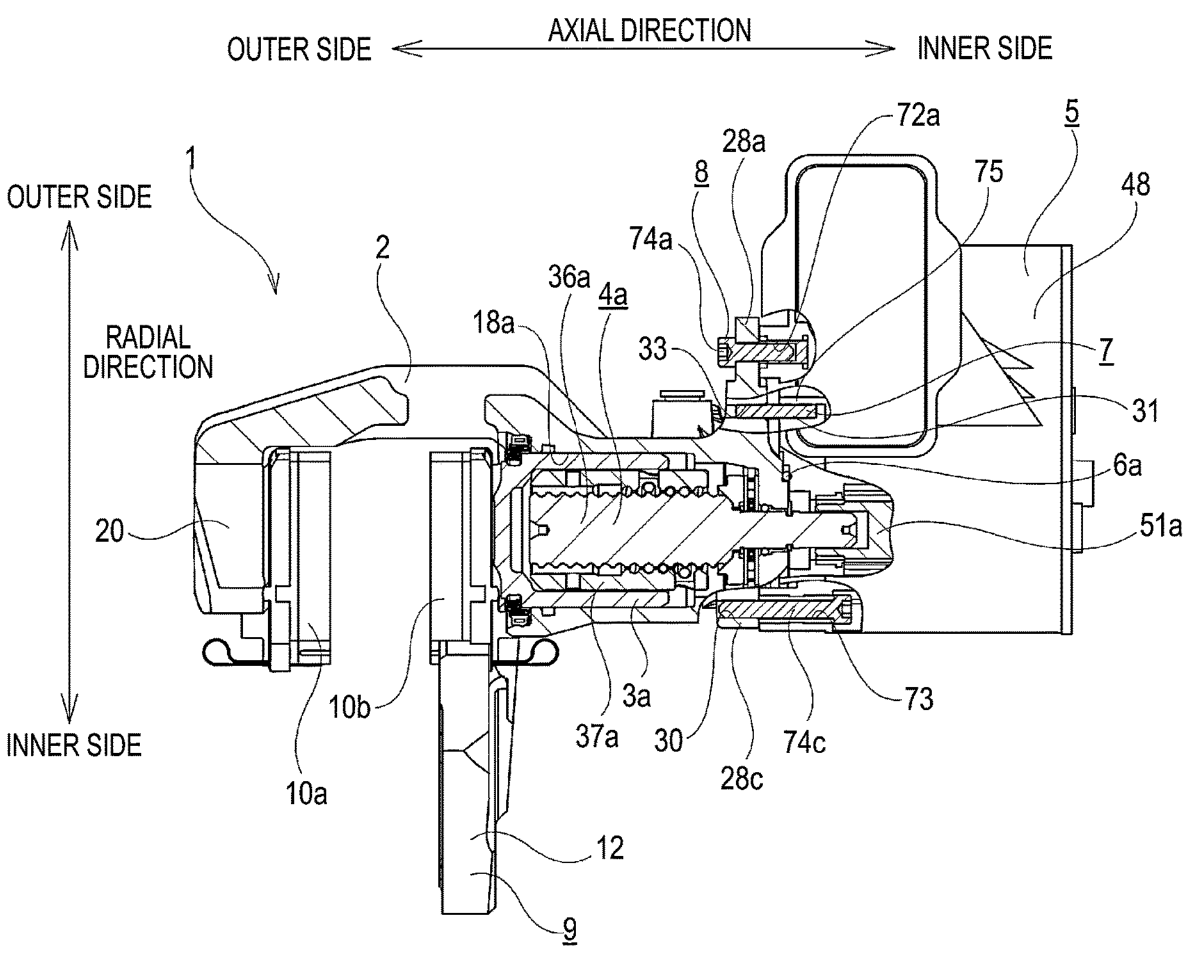
FIG. 8 is a partially cutaway side view of the disc brake device according to the first example of the embodiment as viewed from one side in a circumferential direction.
Figure 9:
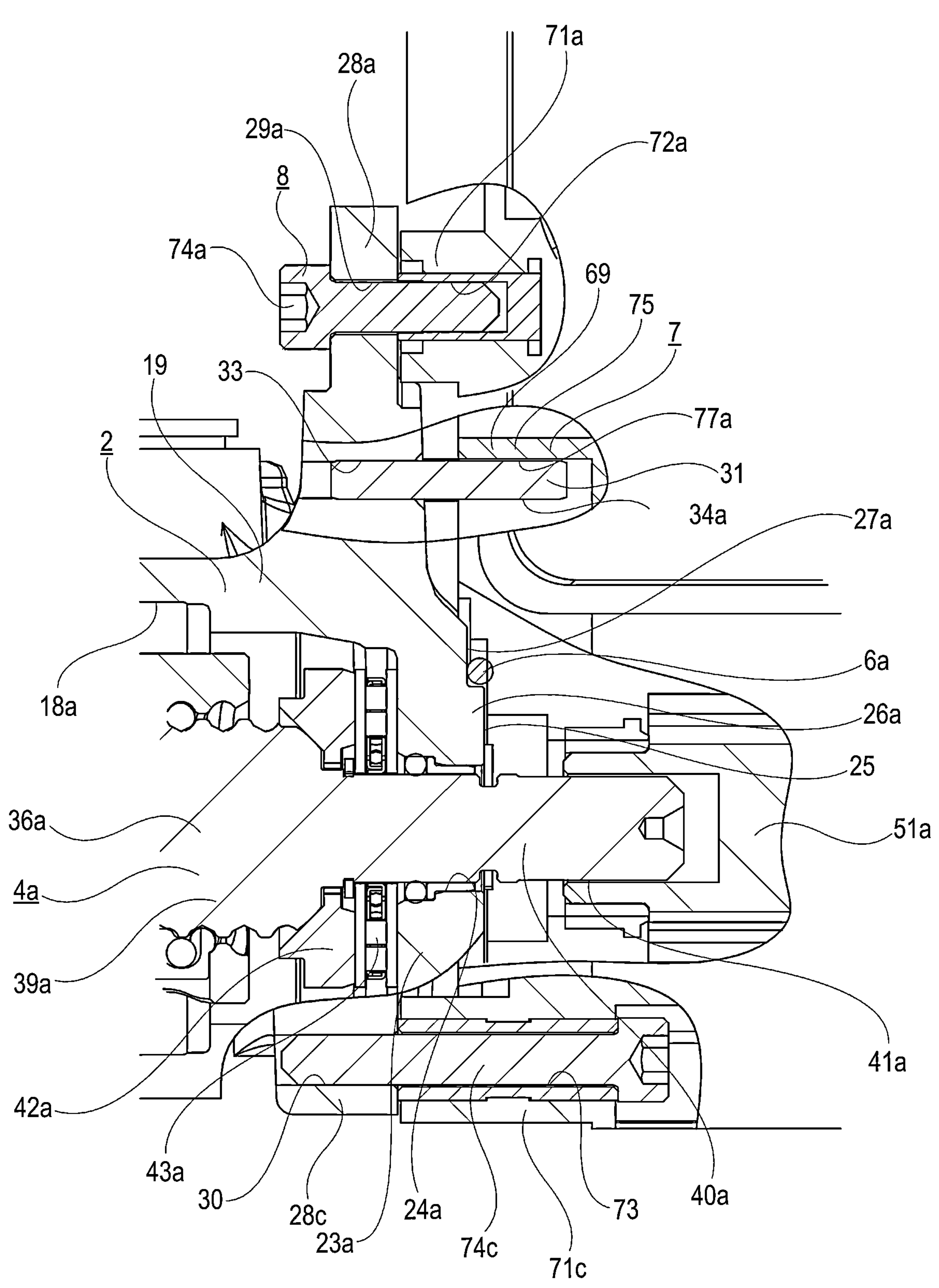
FIG. 9 is a partial enlarged view of FIG. 8.
Figure 10:
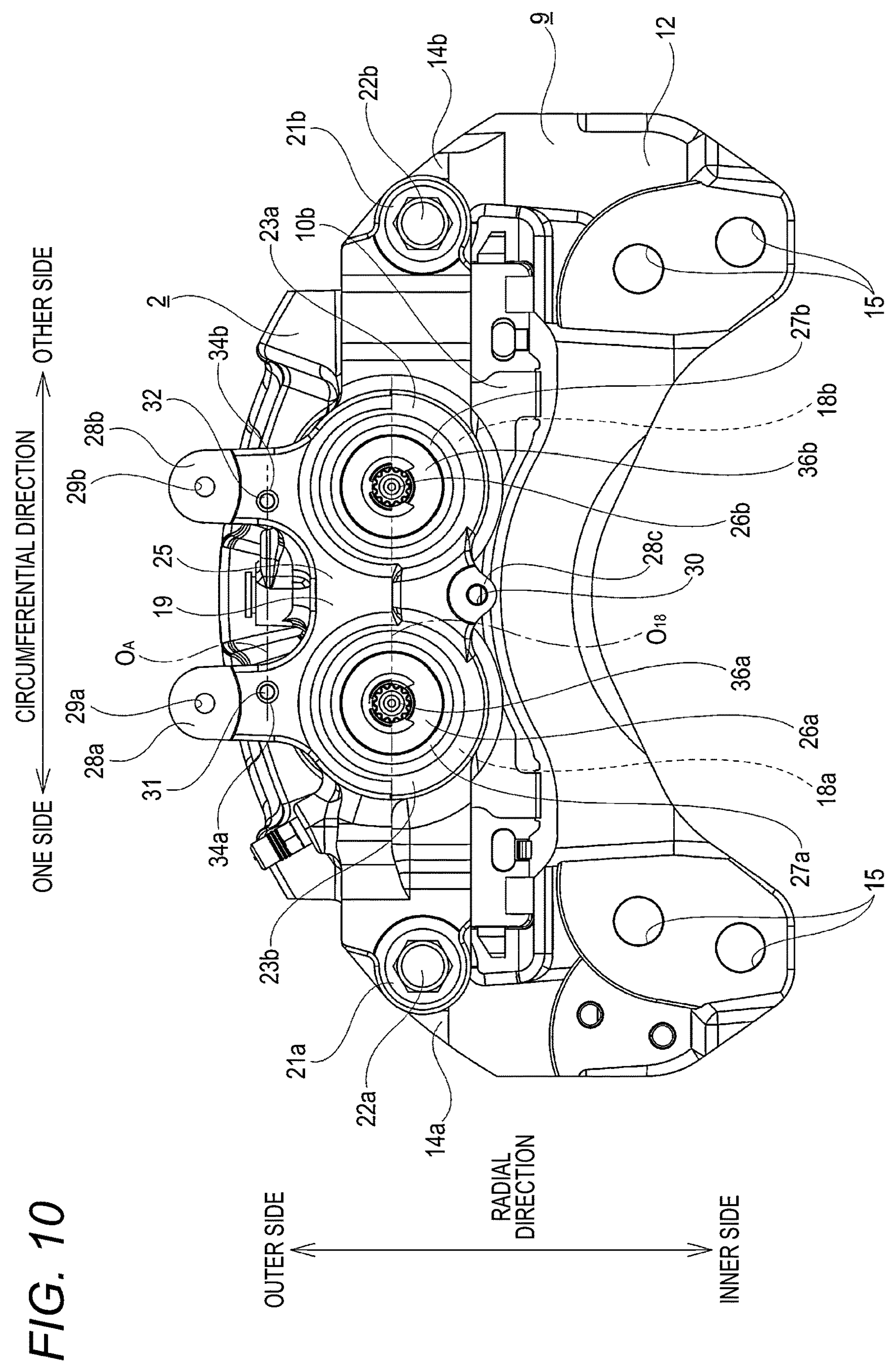
FIG. 10 is a rear view of the disc brake device according to the first example of the embodiment as viewed from the inner side in the axial direction in a state where a motor gear unit is removed.
Figure 11:
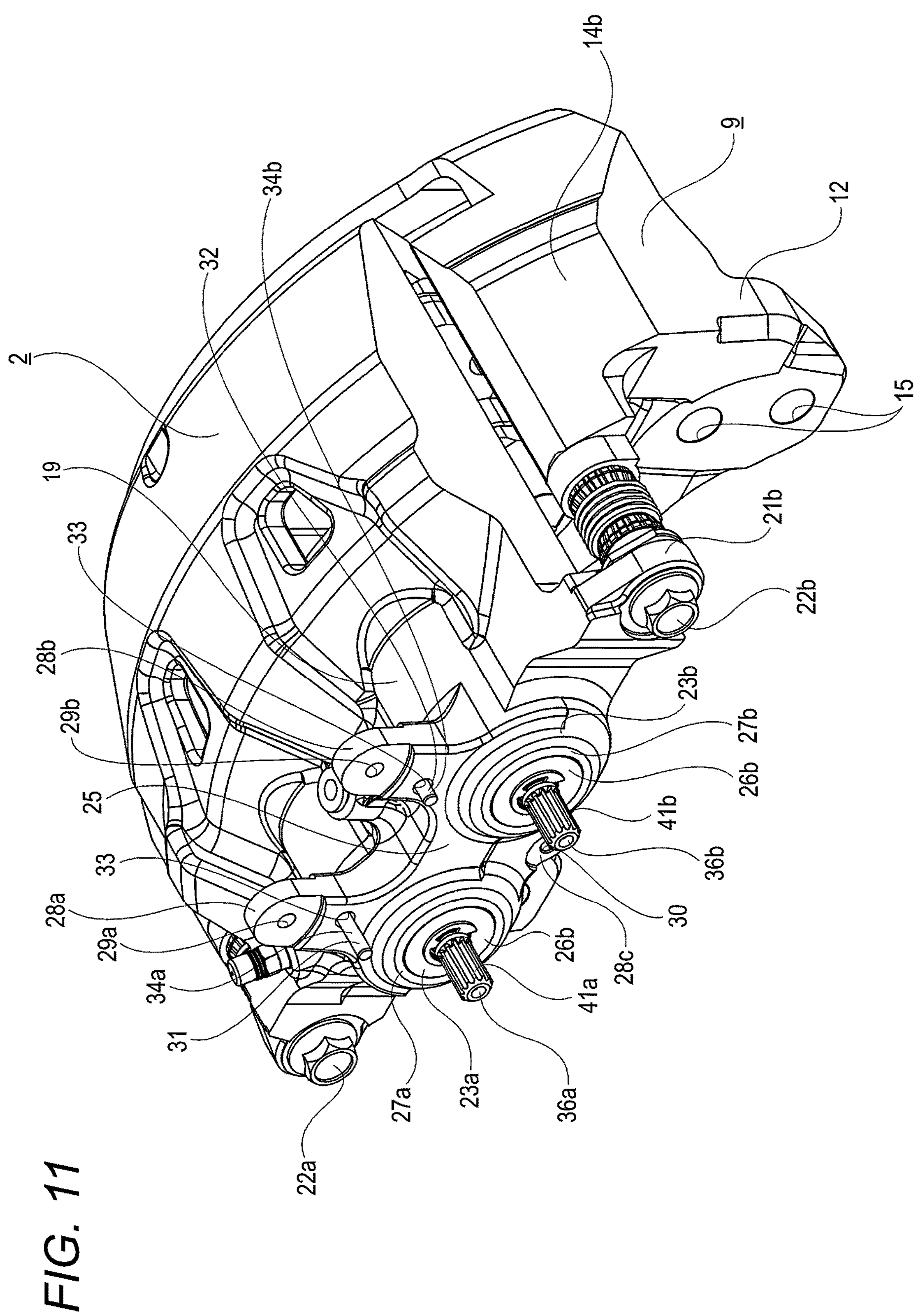
FIG. 11 is a perspective view of the disc brake device according to the first example of the embodiment as viewed from the inner side in the axial direction and the outer side in the radial direction in the state where the motor gear unit is removed.
Figure 12:
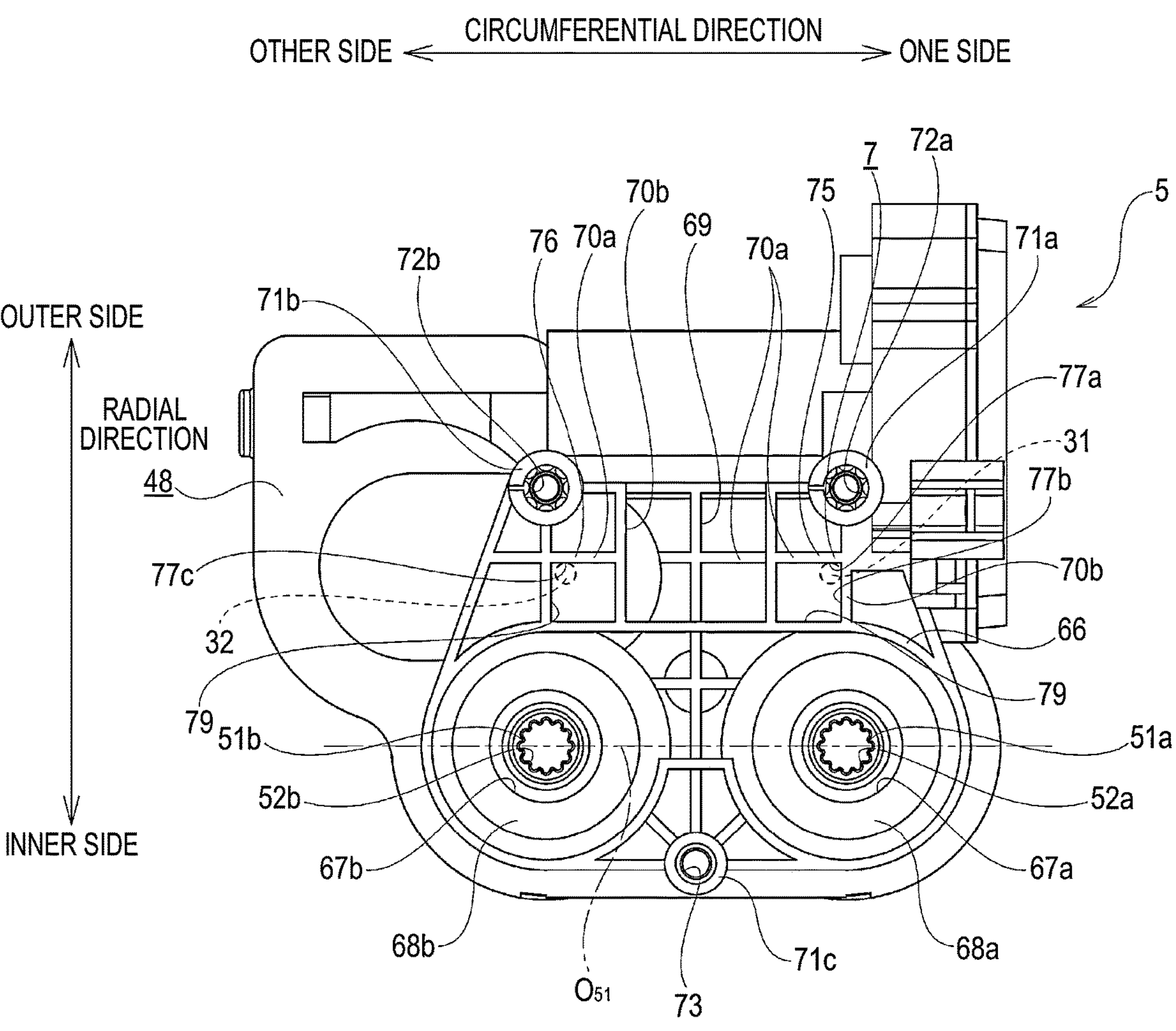
FIG. 12 is a front view of the motor gear unit constituting the disc brake device according to the first example of the embodiment when taken out and viewed from the outer side in the axial direction.
Figure 13:
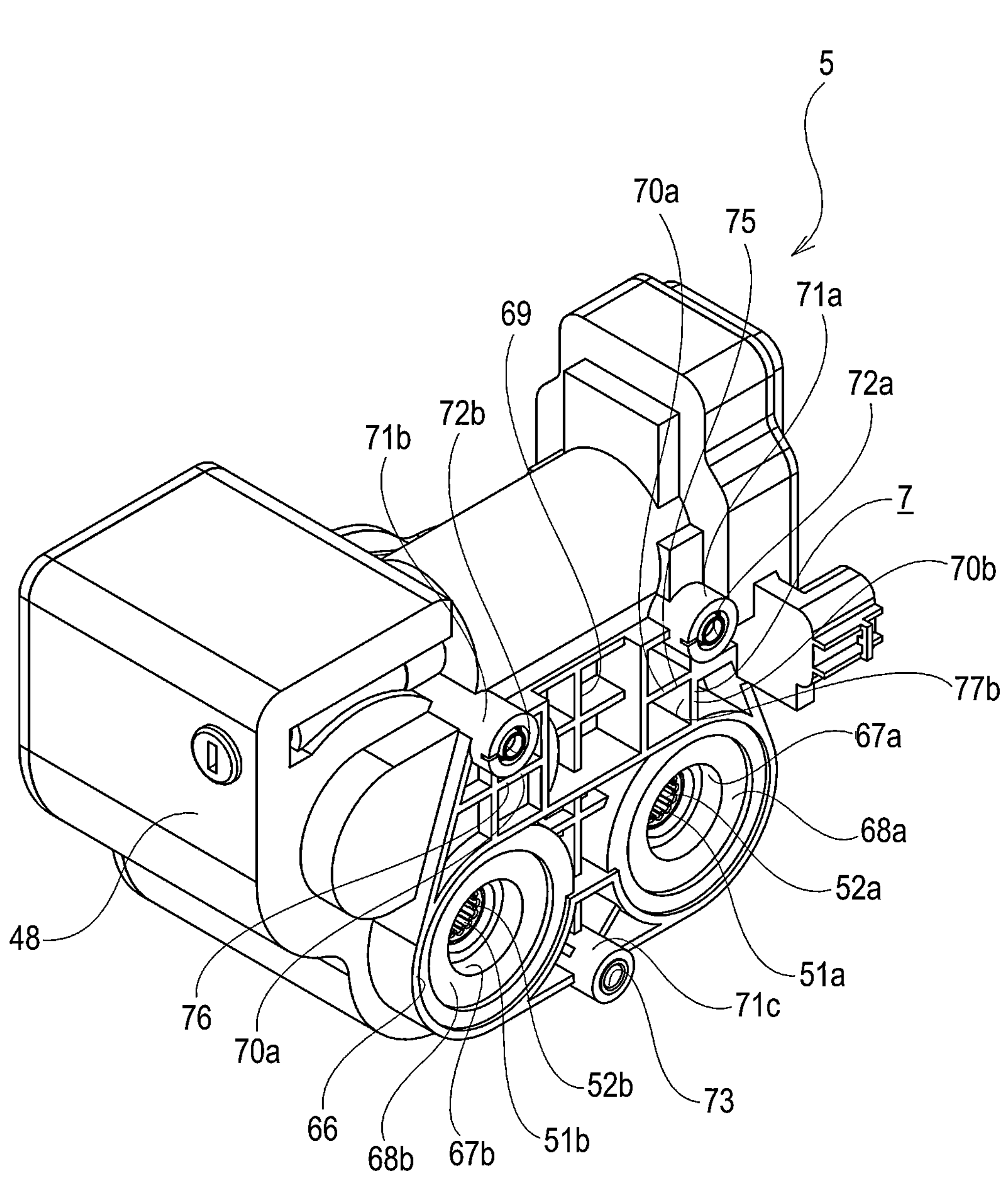
FIG. 13 is a perspective view of the motor gear unit constituting the disc brake device according to the first example of the embodiment when taken out and viewed from the outer side in the axial direction and the outer side in the radial direction.
Figure 14:
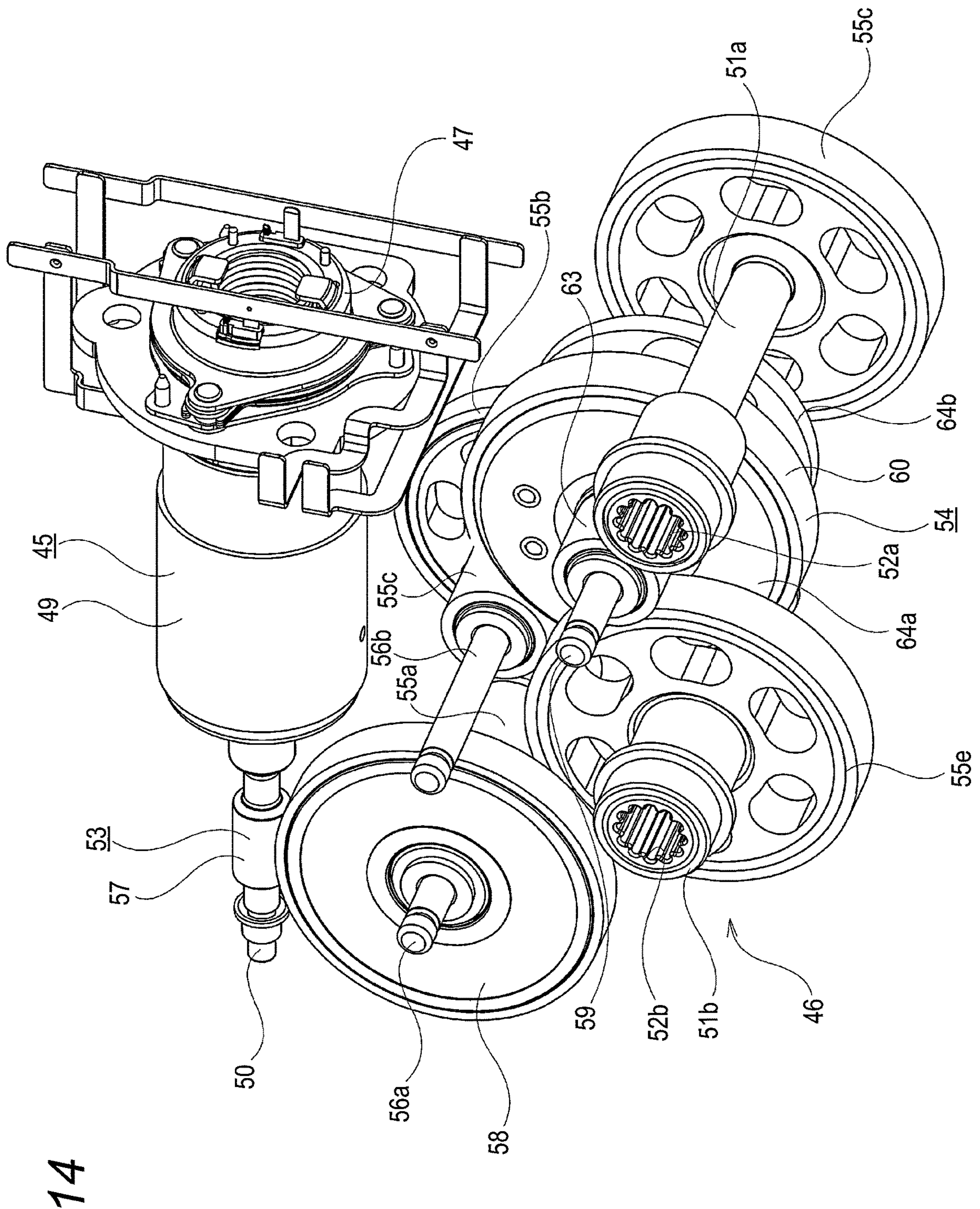
FIG. 14 is a perspective view illustrating the motor gear unit constituting the disc brake device according to the first example of the embodiment when taken out, with a housing omitted.

A first example of the embodiment will be described with reference to FIGS. 1 to 16.

[Overall Configuration of Disc Brake Device]

A disc brake device 1 according to the present example is an electric parking brake type disc brake device, and has both a function as a hydraulic service brake and a function as an electric parking brake.

The disc brake device 1 includes a caliper 2, a plurality of pistons **3*a* and 3*b*, a plurality of rotation-linear motion conversion mechanisms 4*a* and 4*b*, a motor gear unit 5, a plurality of annular seals 6*a* and 6*b*, a position restriction portion 7, and a fixing portion 8**.

The disc brake device 1 according to the present example is a floating-type disc brake device, and further includes a support 9, an outer pad 10*a*, and an inner pad 10*b*.

The disc brake device 1 according to the present example is incorporated in a relatively large vehicle. Therefore, the disc brake device 1 includes two pistons 3*a* and 3*b*, two rotation-linear motion conversion mechanisms 4*a* and 4*b*, and two annular seals 6*a* and 6*b*, but may include three or more of those.

The disc brake device 1 obtains a braking force caused by a service brake by feeding brake oil (pressurized oil) as hydraulic oil to a first cylinder 18*a* and a second cylinder 18*b* provided in the caliper 2. On the other hand, the disc brake device 1 obtains a braking force caused by a parking brake by driving the rotation-linear motion conversion mechanisms 4*a* and 4*b* by the motor gear unit 5 without using the hydraulic oil.

The motor gear unit 5 is fixed to the caliper 2 by the fixing portion 8 in a state where a position of the motor gear unit 5 with respect to the caliper 2 is restricted by the position restriction portion 7. A space between a housing 48 (described later) constituting the motor gear unit 5 and the caliper 2 is sealed by the plurality of annular seals 6*a* and 6*b*. As described above, the disc brake device 1 according to the present example separately includes the position restriction portion 7 for restriction the position of the motor gear unit 5 with respect to the caliper 2 and the fixing portion 8 for fixing the motor gear unit 5 to the caliper 2.

In the following description related to the disc brake device 1, unless otherwise specified, an axial direction, a circumferential direction, and a radial direction refer to an axial direction, a circumferential direction, and a radial direction of a disc-shaped rotor 11 (see FIG. 3) that rotates together with a wheel. A front-back direction in FIGS. 1, 2, 10, 12, and 16, an up-down direction in FIGS. 3, 4, 6, and 7, and a left-right direction in FIGS. 8 and 9 correspond to the axial direction, and a center side of a vehicle body in a state where the disc brake device 1 is attached to the vehicle body is referred to as an inner side in the axial direction, and an outer side of the vehicle body in the state where the disc brake device 1 is attached to the vehicle body is referred to as an outer side in the axial direction. A left-right direction in FIGS. 1 to 4, 6, 7, 10, 12, and 16 and a front-back direction in FIGS. 8 and 9 correspond to the circumferential direction. A right side in FIGS. 1, 3, 6, 7, 12, and 16 and a left side in FIGS. 2, 4, and 10 correspond to one side in the circumferential direction, and a left side in FIGS. 1, 3, 6, 7, 12, and 16 and a right side in FIGS. 2, 4, and 10 correspond to the other side in the circumferential direction. In addition, an up-down direction in FIGS. 1, 2, 8 to 10, 12, and 16 and a front-back direction in FIGS. 3, 4, 6, and 7 correspond to the radial direction, an upper side in FIGS. 1, 2, 8 to 10, 12, and 16 is an outer side in the radial direction, and a lower side in FIGS. 1, 2, 8 to 10, 12, and 16 is an inner side in the radial direction.

<Support>

The support 9 is a cast product of an iron-based alloy such as cast iron, and includes a support base 12 disposed on the inner side in the axial direction of the rotor 11, an outer connecting portion 13 disposed on the outer side in the axial direction of the rotor 11, and a pair of connecting arms 14*a* and 14*b* connecting, in the axial direction, end portions on both outer sides in the circumferential direction of the support base 12 and end portions on both outer sides in the circumferential direction of the outer connecting portion 13, respectively. A guide hole (not illustrated) that is open to the inner side in the axial direction is formed in a portion on the outer side in the radial direction of each of the connecting arms 14*a* and 14*b*. The support 9 is fixed to a suspension device constituting the vehicle body using a plurality of (four in the illustrated example) mounting holes 15 formed in a portion on the inner side in the radial direction of the support base 12.

In the disc brake device 1 according to the present example, in a state where the support 9 is fixed to the suspension device, the connecting arm 14*a* on one side in the circumferential direction is disposed on the upper side in the up-down direction, and the connecting arm 14*b* on the other side in the circumferential direction is disposed on the lower side in the up-down direction. However, an assembling direction of the disc brake device 1 is not particularly limited.

<Outer Pad and Inner Pad>

The outer pad 10*a* and the inner pad 10*b* are disposed on both sides in the axial direction of the rotor 11 so as to sandwich the rotor 11 from both sides in the axial direction. The outer pad 10*a* is disposed on the outer side in the axial direction of the rotor 11, and is supported so as to be displaceable in the axial direction with respect to the support 9. The inner pad 10*b* is disposed on the inner side in the axial direction of the rotor 11, and is supported so as to be displaceable in the axial direction with respect to the support 9.

Each of the outer pad 10*a* and the inner pad 10*b* includes a lining 16 and a metal back plate 17 supporting a back surface of the lining 16.

<Caliper>

The caliper 2 is made of an aluminum-based alloy or an iron-based alloy, and has an inverted U-shape as viewed from the circumferential direction.

The caliper 2 has a clamp base 19 including a plurality of cylinders 18*a* and 18*b* on the inner side in the axial direction with respect to the rotor 11, and has a pressing portion 20 on the outer side in the axial direction with respect to the rotor 11. The clamp base 19 and the pressing portion 20 are connected in the axial direction. In addition, the clamp base 19 has a pair of arms 21*a* and 21*b* on end portions on both sides in the circumferential direction.

The caliper 2 is supported so as to be displaceable in the axial direction with respect to the support 9 using guide pins 22*a* and 22*b*. Thus, end portions on the inner side in the axial direction of the guide pins 22*a* and 22*b* are fixed to the arms 21*a* and 21*b*, and end portions to intermediate portions on the outer side in the axial direction of the guide pins 22*a* and 22*b* are inserted into the inner side of the guide holes provided in the connecting arms 14*a* and 14*b* of the support 9 so as to be relatively displaceable in the axial direction.

In the present example, the caliper 2 has two cylinders of the first cylinder 18*a* and the second cylinder 18*b*.

Each of the first cylinder 18*a* and the second cylinder 18*b* is a substantially cylindrical space, and is open in an outer surface in the axial direction of the clamp base 19. End portions on the inner side in the axial direction of each of the first cylinder 18*a* and the second cylinder 18*b* are closed by bottom portions 23*a* and 23*b*. In this case, the bottom portions 23*a* and 23*b* are provided with insert-through holes 24*a* and 24*b* for allowing end portions on the inner side in the axial direction of spindles 36*a* and 36*b* (described later) to be inserted therethrough.

In the present example, the motor gear unit 5 is fixed to the inner side in the axial direction of the caliper 2. Therefore, the clamp base 19 has a housing facing surface 25 on an inner surface in the axial direction.

The insert-through holes 24*a* and 24*b* are open in the housing facing surface 25. In addition, annular convex portions 26*a* and 26*b*, which are disposed coaxially with central axes of the respective insert-through holes 24*a* and 24*b* and slightly protrude toward the inner side in the axial direction, are provided around the insert-through holes 24*a* and 24*b* within the housing facing surface 25. Further, circular ring surfaces 27*a* and 27*b* are provided around the annular convex portions 26*a* and 26*b*. The circular ring surface 27*a* is a flat surface existing on a virtual plane orthogonal to a central axis of the first cylinder 18*a*, and the circular ring surface 27*b* is a flat surface existing on a virtual plane orthogonal to a central axis of the second cylinder 18*b*.

In the present example, in order to fix the motor gear unit 5 to the caliper 2, a plurality of (three in the illustrated example) mounting flanges 28*a* to 28*c* are provided in the clamp base 19.

Among the mounting flanges 28*a* to 28*c*, two mounting flanges 28*a* and 28*b* provided on a portion on the outer side in the radial direction of the clamp base 19 are formed in a tongue-like plate shape. The mounting flanges 28*a* and 28*b* are disposed apart from each other in the circumferential direction and each extends toward the outer side in the radial direction.

The mounting flange 28*a* on one side in the circumferential direction is disposed on the outer side in the radial direction of the first cylinder 18*a*, and the mounting flange 28*b* on the other side in the circumferential direction is disposed on the outer side in the radial direction of the second cylinder 18*b*. Through holes 29*a* and 29*b* are provided in a portion on the outer side in the radial direction of the mounting flanges 28*a* and 28*b*, respectively. Mounting bolts 74*a* and 74*b* (described later) serving as the fixing portion 8 are loosely inserted into the through holes 29*a* and 29*b*, respectively, in the axial direction.

Among the mounting flanges 28*a* to 28*c*, one mounting flange 28*c* provided on a portion on the inner side in the radial direction of the clamp base 19 is formed in a triangular plate shape. The mounting flange 28*c* is disposed on a portion between the first cylinder 18*a* and the second cylinder 18*b* in the circumferential direction, and extends toward the inner side in the radial direction. The mounting flange 28*c* is provided with a female screw hole 30. A mounting bolt 74*c* (described later) serving as the fixing portion 8 is screwed into the female screw hole 30.

Inner surfaces in the axial direction of the respective mounting flanges 28*a* to 28*c* constitute the housing facing surface 25.

The caliper 2 has a plurality of caliper-side restriction portions 31 and 32 constituting the position restriction portion 7 in order to restrict the position of the motor gear unit 5 with respect to the caliper 2. In the present example, the caliper 2 has two caliper-side restriction portions of a first caliper-side restriction portion 31 and a second caliper-side restriction portion 32.

Each of the first caliper-side restriction portion 31 and the second caliper-side restriction portion 32 is formed of a pin member having a columnar shape, is formed separately from the caliper 2, and is fixed to the caliper 2. A diameter of each of the first caliper-side restriction portion 31 and the second caliper-side restriction portion 32 is constant over a total length. In the present example, the first caliper-side restriction portion 31 and the second caliper-side restriction portion 32 are parts having the same diameter but different total lengths, but common parts having the same total length as well as the same diameter may be used. In addition, parts having different diameters and total lengths may be used.

The first caliper-side restriction portion 31 and the second caliper-side restriction portion 32 are fixed to the mounting flanges 28*a* and 28*b*, respectively. Specifically, the first caliper-side restriction portion 31 and the second caliper-side restriction portion 32 are fixed to the mounting flanges 28*a* and 28*b* by press-fitting respective half portions thereof on the outer side in the axial direction into fixing holes 33 formed in the intermediate portions in the radial direction of the mounting flanges 28*a* and 28*b*. Respective half portions on the inner side in the axial direction of the respective first caliper-side restriction portion 31 and second caliper-side restriction portion 32 protrude in the axial direction from the inner surfaces in the axial direction of the mounting flanges 28*a* and 28*b*, and have a convex shape. As a fixing method for fixing the caliper-side restriction portion to the caliper, other methods such as adhesion fixing and caulking fixing can be adopted in addition to press-fitting fixing.

The first caliper-side restriction portion 31 and the second caliper-side restriction portion 32 respectively have, on an outer peripheral surface of a portion protruding in the axial direction from the inner surface in the axial direction of the mounting flange 28*a* or 28*b*, one of caliper-side restriction surfaces 34*a* and 34*b* having a convex cylindrical surface shape (curved surface shape). Examples of the curved surface shape include a cylindrical surface shape, a spherical surface shape, and a paraboloid shape.

Since the first caliper-side restriction portion 31 and the second caliper-side restriction portion 32 are respectively fixed to the intermediate portions in the radial direction of the mounting flanges 28*a* and 28*b*, the first caliper-side restriction portion 31 and the second caliper-side restriction portion 32 are disposed non-coaxially with a first spindle 36*a* (described later) disposed coaxially with the first cylinder 18*a* in the first cylinder 18*a* and a second spindle 36*b* (described later) disposed coaxially with the second cylinder 18*b* in the second cylinder 18*b*.

In the present example, with reference to a position of the first caliper-side restriction portion 31, a circumferential position and a radial position of the second caliper-side restriction portion 32 are restricted, and a circumferential position and a radial position of the central axis of each of the first cylinder 18*a* and the second cylinder 18*b* are restricted.

The first caliper-side restriction portion 31 and the second caliper-side restriction portion 32 are disposed to be separated from each other in the circumferential direction. A central axis of the first caliper-side restriction portion 31 and a central axis of the second caliper-side restriction portion 32 are disposed parallel to each other.

A virtual line $O_A$ orthogonal to the central axis of each of the first caliper-side restriction portion 31 and the second caliper-side restriction portion 32 is disposed parallel to a virtual line $O_{18}$ orthogonal to the central axis of each of the first cylinder 18*a* and the second cylinder 18*b*.

The first caliper-side restriction portion 31 is disposed on the other side in the circumferential direction with respect to a virtual line connecting a central axis of the through hole 29*a* of the mounting flange 28*a* and the central axis of the first cylinder 18*a*, and the second caliper-side restriction portion 32 is disposed on one side in the circumferential direction with respect to a virtual line connecting a central axis of the through hole 29*b* of the mounting flange 28*b* and the central axis of the second cylinder 18*b*. However, the first caliper-side restriction portion 31 may be disposed on the virtual line connecting the central axis of the through hole 29*a* and the central axis of the first cylinder 18*a* or on one side in the circumferential direction with respect to the virtual line, and the second caliper-side restriction portion 32 may be disposed on the virtual line connecting the central axis of the through hole 29*b* and the central axis of the second cylinder 18*b* or on the other side in the circumferential direction with respect to the virtual line.

In the present example, the first caliper-side restriction portion 31 and the second caliper-side restriction portion 32 are formed separately from the caliper 2 and fixed to the caliper 2, but two or one caliper-side restriction portion may be formed integrally with the caliper.

<Piston>

The disc brake device 1 according to the present example includes two pistons of a first piston 3*a* and a second piston 3*b*. The first piston 3*a* is fitted into the first cylinder 18*a*. The second piston 3*b* is fitted into the second cylinder 18*b*. Each of the first piston 3*a* and the second piston 3*b* is made of carbon steel such as S10C or S45C, and is formed in a bottomed cylindrical shape.

Female splines 35*a* and 35*b* are provided on inner peripheral surfaces of the first piston 3*a* and the second piston 3*b*, respectively. End portions on the outer side in the axial direction of the first piston 3*a* and the second piston 3*b* are suppressed from rotating with respect to the back plate 17 of the inner pad 10*b* by a rotation-suppressing mechanism (not illustrated). A piston boot is extended across a portion between a portion on the outer side in the axial direction of an outer peripheral surface of the first piston 3*a* and an opening edge portion on the outer side in the axial direction of the first cylinder 18*a*, and a portion between a portion on the outer side in the axial direction of an outer peripheral surface of the second piston 3*b* and an opening edge portion on the outer side in the axial direction of the second cylinder 18*b*.

<Rotation-Linear Motion Conversion Mechanism>

The disc brake device 1 according to the present example includes two rotation-linear motion conversion mechanisms of a first rotation-linear motion conversion mechanism 4*a* and a second rotation-linear motion conversion mechanism 4*b*. Each of the first rotation-linear motion conversion mechanism 4*a* and the second rotation-linear motion conversion mechanism 4*b* is a feed screw mechanism that converts a rotational motion into a linear motion and changes a total length in the axial direction during operation.

The first rotation-linear motion conversion mechanism 4*a* is disposed in the first cylinder 18*a* and pushes out the first piston 3*a* toward the rotor 11. The first rotation-linear motion conversion mechanism 4*a* includes the first spindle 36*a* corresponding to a rotation member, a first nut 37*a* corresponding to a linear motion member, and a plurality of balls 38*a*. Each of the first spindle 36*a* and the first nut 37*a* is disposed coaxially with the first cylinder 18*a*.

The second rotation-linear motion conversion mechanism 4*b* is disposed in the second cylinder 18*b* and pushes out the second piston 3*b* toward the rotor 11. The second rotation-linear motion conversion mechanism 4*b* includes the second spindle 36*b* corresponding to a rotation member, a second nut 37*b* corresponding to a linear motion member, and a plurality of balls 38*b*. Each of the second spindle 36*b* and the second nut 37*b* is disposed coaxially with the second cylinder 18*b*. Therefore, the first spindle 36*a* and the second spindle 36*b* are disposed parallel to each other.

In the present example, since the circumferential position and the radial position of the central axis of each of the first cylinder 18*a* and the second cylinder 18*b* are restricted with reference to the position of the first caliper-side restriction portion 31, a circumferential position and a radial position of each of the first spindle 36*a* disposed coaxially with the first cylinder 18*a* and the second spindle 36*b* disposed coaxially with the second cylinder 18*b* are restricted with reference to the position of the first caliper-side restriction portion 31.

The first spindle 36*a* and the second spindle 36*b* respectively include large-diameter shafts 39*a* and 39*b* in half portions thereof on the outer side in the axial direction and include small-diameter shafts 40*a* and 40*b* in half portions thereof on the inner side in the axial direction. A spiral shaft-side screw groove is provided on an outer peripheral surface of each of the large-diameter shafts 39*a* and 39*b*. Intermediate portions in the axial direction of the small-diameter shafts 40*a* and 40*b* are respectively inserted into the insert-through holes 24*a* and 24*b* formed in the bottom portions 23*a* and 23*b* of the clamp base 19. Therefore, portions on the inner side in the axial direction of the respective small-diameter shafts 40*a* and 40*b* protrude toward the inner side in the axial direction from the clamp base 19. Male serrations 41*a* and 41*b* are formed on the outer peripheral surfaces of the portions on the inner side in the axial direction of the small-diameter shafts 40*a* and 40*b*, respectively.

Supporting rings 42*a* and 42*b* and thrust bearings 43*a* and 43*b* are fitted on the portions on the outer side in the axial direction of the small-diameter shafts 40*a* and 40*b*, respectively. The supporting rings 42*a* and 42*b* and the thrust bearings 43*a* and 43*b* are sandwiched in the axial direction between the large-diameter shafts 39*a* and 39*b* and the bottom portions 23*a* and 23*b* of the clamp base 19. As a result, a thrust load applied to the first spindle 36*a* and the second spindle 36*b* can be supported by the bottom portions 23*a* and 23*b*, and the first spindle 36*a* and the second spindle 36*b* can be rotated relative to the bottom portions 23*a* and 23*b*.

The first nut 37*a* and the second nut 37*b* have spiral nut-side screw grooves on inner peripheral surfaces thereof, and have male splines 44*a* and 44*b* on outer peripheral surfaces thereof, respectively.

The first nut 37*a* is disposed on the inner side of the first piston 3*a*, and the male spline 44*a* on the outer peripheral surface is spline-engaged with the female spline 35*a* provided in the first piston 3*a*. As a result, the first nut 37*a* is engaged with the first piston 3*a* so as to be relatively displaceable and non-rotatable in the axial direction. In addition, the second nut 37*b* is disposed on the inner side of the second piston 3*b*, and the male spline 44*b* on the outer peripheral surface is spline-engaged with the female spline 35*b* provided in the second piston 3*b*. As a result, the second nut 37*b* is engaged with the second piston 3*b* so as to be relatively displaceable and non-rotatable in the axial direction.

The balls 38*a* and 38*b* are disposed so as to be able to roll on an inner side of a spiral load path formed between the shaft-side screw groove and the nut-side screw groove. A start point and an end point of the load path are connected by a circulation path.

The first rotation-linear motion conversion mechanism 4*a* and the second rotation-linear motion conversion mechanism 4*b* respectively move the first nut 37*a* and the second nut 37*b* in the axial direction by rotationally driving the first spindle 36*a* and the second spindle 36*b*. Specifically, when the first spindle 36*a* and the second spindle 36*b* are rotationally driven in a forward rotation direction, the first nut 37*a* and the second nut 37*b* are moved in a direction approaching the rotor 11 (outer side in the axial direction). On the other hand, when the first spindle 36*a* and the second spindle 36*b* are rotationally driven in a reverse rotation direction, the first nut 37*a* and the second nut 37*b* are moved in a direction away from the rotor 11 (inner side in the axial direction). In addition, as the first rotation-linear motion conversion mechanism 4*a* and the second rotation-linear motion conversion mechanism 4*b*, a sliding feed screw device in which balls are omitted may be used.

<Motor Gear Unit>

The motor gear unit (MGU, electric drive device) 5 is a unit for electrically driving the first rotation-linear motion conversion mechanism 4*a* and the second rotation-linear motion conversion mechanism 4*b*, and includes an electric motor 45, a deceleration mechanism 46 including a first output shaft 51*a* and a second output shaft 51*b*, a non-excited operation brake 47, and the housing 48.

<<Electric Motor>>

Figure 15:
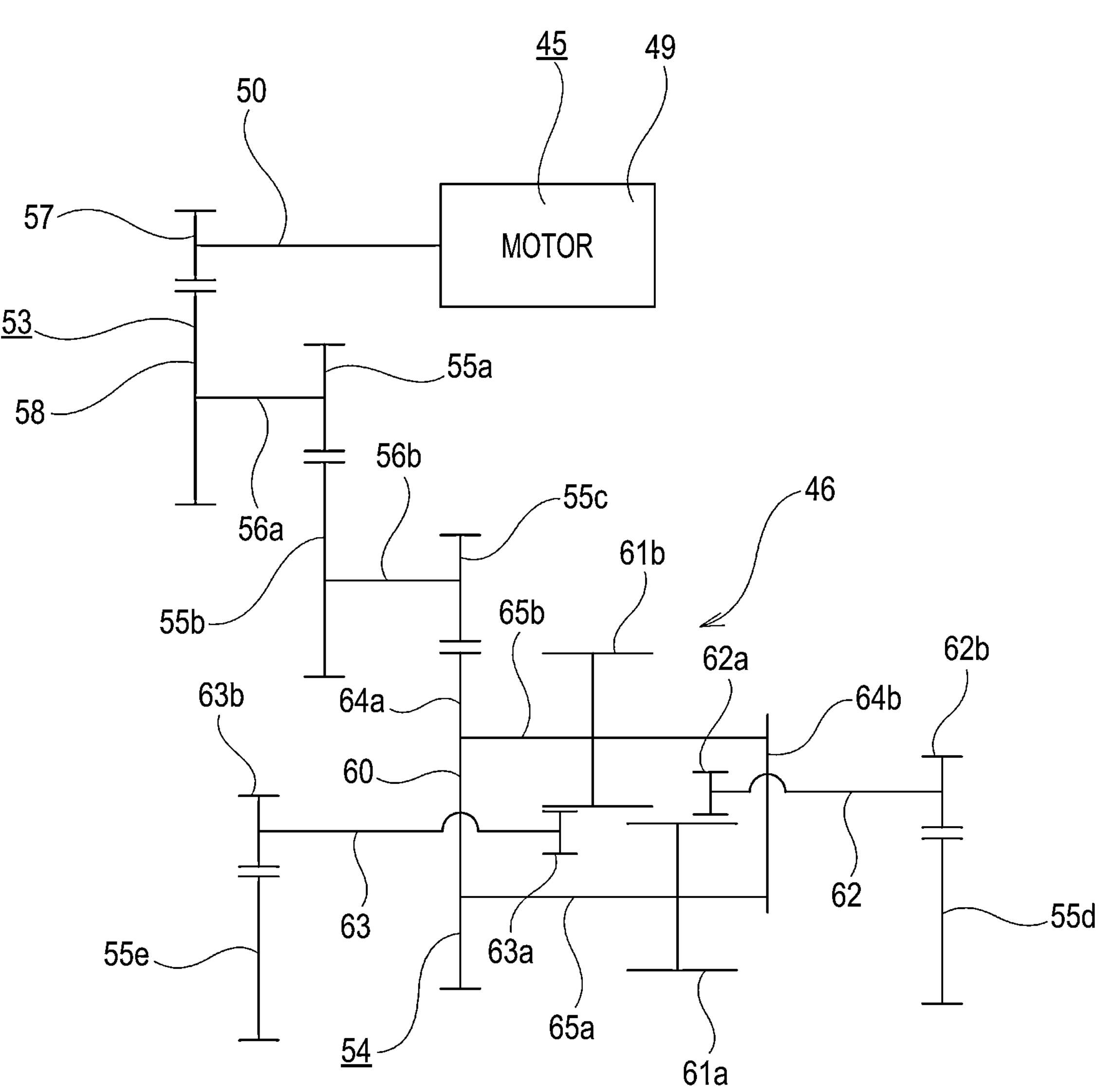
FIG. 15 is a schematic view illustrating a deceleration mechanism constituting the disc brake device according to the first example of the embodiment.
Figure 16:
FIG. 16 is a schematic cross-sectional view of a position restriction portion according to the first example of the embodiment.
Figure 16:
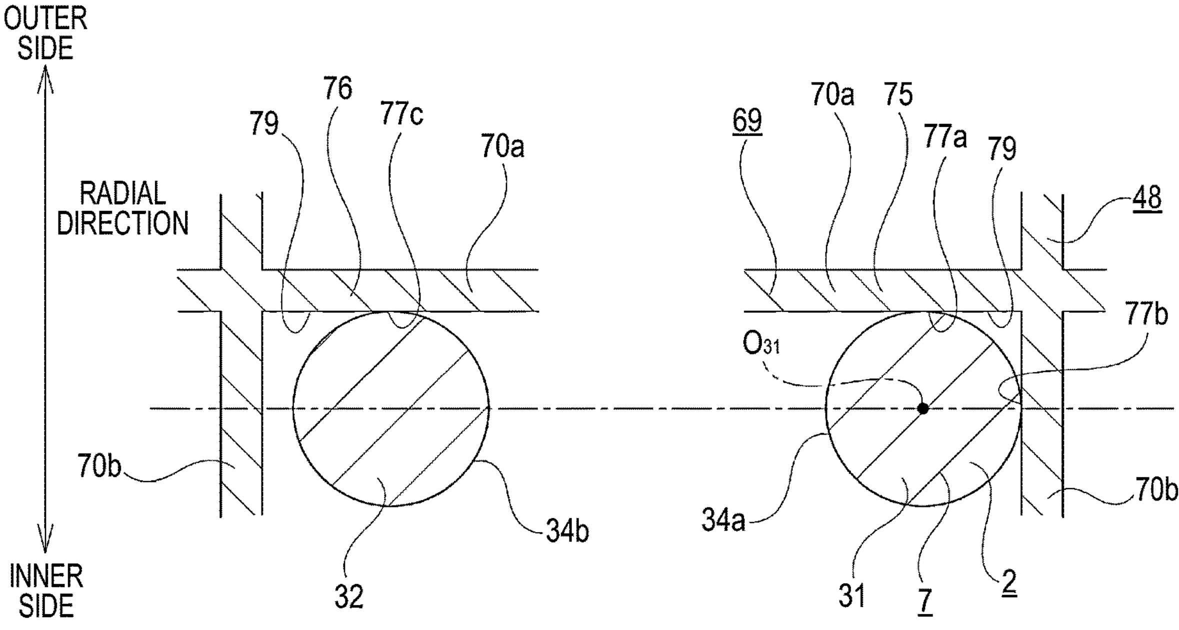

The electric motor 45 includes a motor main body 49 and a motor shaft 50. In FIG. 15, the motor main body 49 and the motor shaft 50 which are components of the electric motor 45 are schematically illustrated.

End portions on both sides in the axial direction of the motor shaft 50 protrude from the motor main body 49 to both sides in the axial direction. The deceleration mechanism 46 is connected to the end portion on one side in the axial direction of the motor shaft 50. On the other hand, the non-excited operation brake 47 is connected to the end portion on the other side in the axial direction of the motor shaft 50.

<<Deceleration Mechanism>>

The deceleration mechanism 46 increases a torque (power) of the electric motor 45 and transmits the increased torque to the first rotation-linear motion conversion mechanism 4*a* and the second rotation-linear motion conversion mechanism 4*b*.

In order to transmit rotation of the electric motor 45 to the first spindle 36*a* and the second spindle 36*b*, the deceleration mechanism 46 includes the output shafts 51*a* and 51*b* that have the same number as the spindles 36*a* and 36*b* and correspond to output members. The output member is not particularly limited as long as it is a member connectable to the rotation member and rotatable around its own central axis, and an output shaft, an output gear, an output pulley, or the like can be adopted.

In the present example, two output shafts of the first output shaft 51*a* and the second output shaft 51*b* are provided. The first output shaft 51*a* is disposed coaxially with the first spindle 36*a*, and is rotatably supported on an inner side of the housing 48. The second output shaft 51*b* is disposed coaxially with the second spindle 36*b*, and is rotatably supported on the inner side of the housing 48.

The first output shaft 51*a* and the second output shaft 51*b* respectively have serration holes 52*a* and 52*b* on end portions thereof on the outer side in the axial direction. The serration holes 52*a* and 52*b* are open in end surfaces on the outer side in the axial direction of the first output shaft 51*a* and the second output shaft 51*b*, respectively.

An end portion on the inner side in the axial direction of the first spindle 36*a* is inserted into the serration hole 52*a* of the first output shaft 51*a*. As a result, the serration hole 52*a* and the male serration 41*a* provided on the first spindle 36*a* are serration-engaged with each other, and the first output shaft 51*a* and the first spindle 36*a* are connected to each other in a relatively non-rotatable manner. In addition, an end portion on the inner side in the axial direction of the second spindle 36*b* is inserted into the serration hole 52*b* of the second output shaft 51*b*. As a result, the serration hole 52*b* and the male serration 41*b* provided on the second spindle 36*b* are serration-engaged with each other, and the second output shaft 51*b* and the second spindle 36*b* are connected to each other in a relatively non-rotatable manner.

The deceleration mechanism 46 according to the present example further includes a worm deceleration mechanism 53, a power distribution mechanism (differential) 54, a plurality of gears (spur gears) 55*a* to 55*e*, and a plurality of transmission shafts 56*a* and 56*b*. The plurality of transmission shafts 56*a* and 56*b* are rotatably supported on the inner side of the housing 48. In FIG. 15, some of the worm deceleration mechanism 53, the power distribution mechanism 54, the plurality of gears 55*a* to 55*e*, and the transmission shafts 56*a* and 56*b*, which are components of the deceleration mechanism 46, are schematically illustrated.

The worm deceleration mechanism 53 is connected to an end portion on one side in the axial direction of the motor shaft 50. The worm deceleration mechanism 53 includes a worm 57 and a worm wheel 58, and does not have a self-lock function.

The worm 57 is disposed coaxially with the motor shaft 50, and is connected to the end portion on one side in the axial direction of the motor shaft 50 in a relatively non-rotatable manner.

The worm wheel 58 is fixed so as not to be rotatable relative to the transmission shaft 56*a*, and meshes with the worm 57.

A first gear 55*a* is externally fitted and fixed to the transmission shaft 56*a* in a relatively non-rotatable manner at a portion deviated from the worm wheel 58 in the axial direction. The first gear 55*a* meshes with a second gear 55*b* that is externally fitted and fixed so as not to be rotatable relative to the transmission shaft 56*b*. A third gear 55*c* having a smaller number of teeth than the second gear 55*b* is externally fitted and fixed to the transmission shaft 56*b* in a relatively non-rotatable manner at a portion deviated from the second gear 55*b* in the axial direction. The third gear 55*c* meshes with an input element 60 constituting the power distribution mechanism 54.

A fourth gear 55*d* as a final gear is externally fitted and fixed to the first output shaft 51*a*, and a fifth gear 55*e* as a final gear is externally fitted and fixed to the second output shaft 51*b*. The fourth gear 55*d* meshes with a first output element 62 (described later) constituting the power distribution mechanism 54, and the fifth gear 55*e* meshes with a second output element 63 (described later) constituting the power distribution mechanism 54.

The power distribution mechanism 54 includes a support shaft 59, the input element 60, intermediate gears 61*a* and 61*b*, the first output element 62, and the second output element 63. The input element 60, the first output element 62, and the second output element 63 are also gears having tooth portions on outer peripheral surfaces thereof.

The input element 60 includes a pair of support rings 64*a* and 64*b* each having a circular ring shape, and a plurality of pins 65*a* and 65*b* extending between the support rings 64*a* and 64*b*. A tooth portion that meshes with the third gear 55*c* is provided on an outer peripheral surface of one support ring 64*a*. The second output element 63 is inserted into an inner side of the one support ring 64*a*. The first output element 62 is inserted into an inner side of the other support ring 64*b*. The pins 65*a* and 65*b* are disposed parallel to the support shaft 59.

The intermediate gears 61*a* and 61*b* are rotatably supported with respect to the input element 60. Specifically, the intermediate gears 61*a* and 61*b* are rotatably supported around the pins 65*a* and 65*b*, and are disposed on a portion between the pair of support rings 64*a* and 64*b*. The intermediate gear 61*a* and the intermediate gear 61*b* mesh with each other.

The first output element 62 is formed in a hollow cylindrical shape and is rotatably supported around the support shaft 59. The first output element 62 includes an input tooth portion 62*a* and an output tooth portion 62*b*. The input tooth portion 62*a* meshes with one intermediate gear 61*a*. On the other hand, the output tooth portion 62*b* meshes with the fourth gear 55*d* that is externally fitted and fixed to the first output shaft 51*a* in a relatively non-rotatable manner and that is a final gear.

The second output element 63 is formed in a hollow cylindrical shape and is rotatably supported around the support shaft 59. The second output element 63 includes an input tooth portion 63*a* and an output tooth portion 63*b*. The input tooth portion 63*a* meshes with the other intermediate gear 61*b*. On the other hand, the output tooth portion 63*b* meshes with the fifth gear 55*e* that is externally fitted and fixed to the second output shaft 51*b* in a relatively non-rotatable manner and that is a final gear.

Therefore, rotation of the first output element 62 is transmitted to the first output shaft 51*a* through a meshing portion between the output tooth portion 62*b* and the fourth gear 55*d* which is a final gear. In addition, rotation of the second output element 63 is transmitted to the second output shaft 51*b* through a meshing portion between the output tooth portion 63*b* and the fifth gear 55*e* which is a final gear.

The power distribution mechanism 54 has a function of distributing and transmitting power input to the input element 60 to the fourth gear 55*d* which is a final gear fixed to the first output shaft 51*a* in a relatively non-rotatable manner and the fifth gear 55*e* which is a final gear fixed to the second output shaft 51*b* in a relatively non-rotatable manner. Specifically, power corresponding to a magnitude of a rotation load (ease of rotation) of the first spindle 36*a* and the second spindle 36*b* is distributed to the fourth gear 55*d* and the fifth gear 55*e*. As a result, regardless of a difference in efficiency between the first rotation-linear motion conversion mechanism 4*a* and the second rotation-linear motion conversion mechanism 4*b*, a difference is suppressed from occurring between a force with which the first piston 3*a* presses the inner pad 10*b* by the first rotation-linear motion conversion mechanism 4*a* and a force with which the second piston 3*b* presses the inner pad 10*b* by the second rotation-linear motion conversion mechanism 4*b*.

<<Non-Excited Operation Brake>>

The non-excited operation brake 47 is connected to the end portion on the other side in the axial direction of the motor shaft 50. The non-excited operation brake 47 is a friction brake, and has a function of allowing the rotation of the motor shaft 50 when being energized and suppressing the rotation of the motor shaft 50 when not being energized.

<<Housing>>

The housing 48 is made of synthetic resin or metal, and accommodates the electric motor 45, the deceleration mechanism 46, and the non-excited operation brake 47.

The housing 48 is fixed on the inner side in the axial direction of the clamp base 19 constituting the caliper 2. Therefore, the housing 48 has a caliper facing surface 66 on an outer surface in the axial direction.

The caliper facing surface 66 has insertion holes 67*a* and 67*b* in portions facing respective end surfaces on the outer side in the axial direction of the first output shaft 51*a* and the second output shaft 51*b*.

The caliper facing surface 66 has, around the insertion holes 67*a* and 67*b*, annular concave portions 68*a* and 68*b* which are disposed coaxially with respective central axes of the insertion holes 67*a* and 67*b* and are slightly recessed toward the inner side in the axial direction. A bottom surface of the annular concave portion 68*a* has a circular ring shape and is a flat surface existing on a virtual plane orthogonal to a central axis of the first output shaft 51*a*. A bottom surface of the annular concave portion 68*b* has a circular ring shape and is a flat surface existing on a virtual plane orthogonal to a central axis of the second output shaft 51*b*.

The caliper facing surface 66 includes a reinforcing rib 69 in a portion located on the outer side in the radial direction of the annular concave portions 68*a* and 68*b* and a portion located between the annular concave portions 68*a* and 68*b* in the circumferential direction. In the present example, by providing the reinforcing rib 69 in the housing 48, both weight reduction and rigidity ensuring of the housing 48 can be achieved.

A portion located on the outer side in the radial direction with respect to the annular concave portions 68*a* and 68*b* within the reinforcing rib 69 has a lattice shape and includes a plurality of first reinforcing plates 70*a* and a plurality of second reinforcing plates 70*b*.

The plurality of first reinforcing plates 70*a* extend in the circumferential direction and are disposed in parallel to each other so as to be separated in the radial direction. The plurality of second reinforcing plates 70*b* extend in the radial direction and are disposed in parallel to each other so as to be separated in the circumferential direction. The second reinforcing plate 70*b* is disposed at a right angle to the first reinforcing plate 70*a*, and connects two first reinforcing plates 70*a* disposed to be separated in the radial direction.

An interval between the first reinforcing plates 70*a* adjacent to each other in the radial direction is sufficiently larger than diameters of the first caliper-side restriction portion 31 and the second caliper-side restriction portion 32. In addition, an interval between the second reinforcing plates 70*b* adjacent to each other in the circumferential direction is sufficiently larger than the diameters of the first caliper-side restriction portion 31 and the second caliper-side restriction portion 32.

The caliper facing surface 66 has two tubular portions 71*a* and 71*b* on end portions on both sides in the circumferential direction of the end portions on the outer side in the radial direction of the reinforcing rib 69. In addition, the caliper facing surface 66 has a tubular portion 71*c* in a portion on the inner side in the radial direction of a portion between the annular concave portions 68*a* and 68*b* in the circumferential direction. The tubular portions 71*a* to 71*c* project toward the outer side in the axial direction from the reinforcing rib 69. In the present example, in a state where the housing 48 is fixed to the caliper 2, except for a contacting portion between the first caliper-side restriction portion 31 and a first housing-side restriction portion 75 (described later) and a contacting portion between the second caliper-side restriction portion 32 and a second housing-side restriction portion 76 (described later), only the end surfaces on the outer side in the axial direction of the tubular portions 71*a* to 71*c* are brought into contact with the housing facing surface 25.

The two tubular portions 71*a* and 71*b* disposed on the outer side in the radial direction have female screw holes 72*a* and 72*b* in inner peripheral surfaces thereof, respectively. On the other hand, one tubular portion 71*c* disposed on the inner side in the radial direction has a penetration hole 73 on the inner side. The female screw holes 72*a* and 72*b* and the penetration hole 73 are open in the caliper facing surface 66.

The housing 48 is fixed to the inner side in the axial direction of the clamp base 19 of the caliper 2 by using the mounting bolts 74*a* to 74*c* each constituting the fixing portion 8. Specifically, the mounting bolts 74*a* and 74*b* inserted into the through holes 29*a* and 29*b* provided in the mounting flanges 28*a* and 28*b* of the caliper 2 from the outer side in the axial direction to the inner side in the axial direction are screwed into the female screw holes 72*a* and 72*b* of the housing 48, and the mounting bolt 74*c* inserted into the penetration hole 73 of the housing 48 from the inner side in the axial direction to the outer side in the axial direction is screwed into the female screw hole 30 provided in the mounting flange 28*c* of the caliper 2. As a result, the housing 48 is fixed to the inner side in the axial direction of the clamp base 19.

In the present example, the mounting bolts 74*a* and 74*b* are loosely inserted into the through holes 29*a* and 29*b* of the mounting flanges 28*a* and 28*b*, and the mounting bolt 74*c* is loosely inserted into the penetration hole 73 of the housing 48. Therefore, the mounting bolts 74*a* to 74*c* cannot strictly restrict the position of the housing 48 with respect to the caliper 2.

The housing 48 includes a plurality of housing-side restriction portions 75 and 76 constituting the position restriction portion 7 in order to restrict the position of the motor gear unit 5 with respect to the caliper 2. In the present example, the housing 48 includes two housing-side restriction portions of the first housing-side restriction portion 75 and the second housing-side restriction portion 76.

Each of the first housing-side restriction portion 75 and the second housing-side restriction portion 76 is integrally formed with the housing 48. Specifically, each of the first housing-side restriction portion 75 and the second housing-side restriction portion 76 is provided in a part of the reinforcing rib 69. Therefore, each of the first housing-side restriction portion 75 and the second housing-side restriction portion 76 is disposed non-coaxially with each of the first output shaft 51*a* and the second output shaft 51*b*.

The first housing-side restriction portion 75 is formed by the first reinforcing plate 70*a* disposed in a portion in the radial direction between the annular concave portion 68*a* and the tubular portion 71*a* that are disposed on one side in the circumferential direction, and the second reinforcing plate 70*b* in which the end portion on the outer side in the radial direction is connected to the end portion on one side in the circumferential direction of the first reinforcing plate 70*a*. Therefore, the first housing-side restriction portion 75 is formed in an L-shaped plate shape, has a housing-side restriction surface 77*a* having a flat surface shape on the inner surface in the radial direction, and has a housing-side restriction surface 77*b* having a flat surface shape on a side surface facing the other side in the circumferential direction. That is, the first housing-side restriction portion 75 has two housing-side restriction surfaces 77*a* and 77*b* having a flat surface shape. The two housing-side restriction surfaces 77*a* and 77*b* are connected to each other at a right angle.

On the other hand, the second housing-side restriction portion 76 is formed only by the first reinforcing plate 70*a* disposed in a portion in the radial direction between the annular concave portion 68*b* and the tubular portion 71*b* that are disposed on the other side in the circumferential direction. Therefore, the second housing-side restriction portion 76 is formed in a flat plate shape, and has a housing-side restriction surface 77*c* having a flat surface shape on the inner surface in the radial direction. That is, the second housing-side restriction portion 76 has one housing-side restriction surface 77*c* having a flat surface shape.

The housing-side restriction surface 77*a* of the first housing-side restriction portion 75 and the housing-side restriction surface 77*c* of the second housing-side restriction portion 76 exist on the same virtual plane, and are parallel to a virtual line $O_{51}$ orthogonal to each of the central axes of the first output shaft 51*a* and the second output shaft 51*b*.

In the present example, a circumferential position and a radial position of each of the first output shaft 51*a* and the second output shaft 51*b* rotatably supported on the inner side of the housing 48 are restricted with reference to a position of the first housing-side restriction portion 75, that is, a radial position of the housing-side restriction surface 77*a* and a circumferential position of the housing-side restriction surface 77*b*.

In the present example, in a state before the housing 48 is fixed to the caliper 2 by the fixing portion 8, the position of the housing 48 with respect to the caliper 2 is restricted using the position restriction portion 7.

Specifically, when the caliper facing surface 66 is superimposed on the housing facing surface 25, an end portion on the outer side in the radial direction of the caliper-side restriction surface 34*a*, which has a convex cylindrical surface shape, of the first caliper-side restriction portion 31 is brought into contact with the housing-side restriction surface 77*a*, which has a flat surface shape, of the first housing-side restriction portion 75, and an end portion on one side in the circumferential direction of the caliper-side restriction surface 34*a*, which has a convex cylindrical surface shape, of the first caliper-side restriction portion 31 is brought into contact with the housing-side restriction surface 77*b*, which has a flat surface shape, of the first housing-side restriction portion 75. As a result, a circumferential position and a radial position of each of the first caliper-side restriction portion 31 and the first housing-side restriction portion 75 are restricted. In other words, the circumferential position and the radial position of each of the first caliper-side restriction portion 31 and the first housing-side restriction portion 75 are matched. The first caliper-side restriction portion 31 and the first housing-side restriction portion 75 are used as reference points for position restriction.

Further, from a state where the first caliper-side restriction portion 31 and the first housing-side restriction portion 75 are brought into contact with each other, an end portion on the outer side in the radial direction of the caliper-side restriction surface 34*b*, which has a convex cylindrical surface shape, of the second caliper-side restriction portion 32 is brought into contact with the housing-side restriction surface 77*c*, which has a flat surface shape, of the second housing-side restriction portion 76. That is, in the present example, the caliper-side restriction surface 34*b* and the housing-side restriction surface 77*c* are brought into contact with each other in the radial direction. As a result, a relative rotation position (rotation phase) between the caliper 2 and the housing 48 around a central axis $O_{31}$ of the first caliper-side restriction portion 31 serving as a reference point is restricted. In the present example, the position of the housing 48 with respect to the caliper 2 is restricted in this manner.

In the present example, the caliper facing surface 66 is superposed on the housing facing surface 25 in a state where an orientation of the housing 48 is restricted such that a portion on the inner side in the radial direction of the housing 48 faces a lower side in the vertical direction. As a result, the first caliper-side restriction portion 31 and the first housing-side restriction portion 75 can be brought into contact with each other and the second caliper-side restriction portion 32 and the second housing-side restriction portion 76 can be brought into contact with each other by utilizing gravity applied to the housing 48. The housing 48 is fixed to the caliper 2 by the fixing portion 8 in a state where the first caliper-side restriction portion 31 and the first housing-side restriction portion 75 are brought into contact with each other and the second caliper-side restriction portion 32 and the second housing-side restriction portion 76 are brought into contact with each other by the action of gravity.

Alternatively, by utilizing a rotational force (moment force) applied to the housing 48 from the mounting bolts 74*a* and 74*b* when tightening the mounting bolts 74*a* and 74*b*, or a rotational force applied to the caliper 2 from the mounting bolt 74*c* when tightening the mounting bolt 74*c*, the first caliper-side restriction portion 31 and the first housing-side restriction portion 75 can be brought into contact with each other and the second caliper-side restriction portion 32 and the second housing-side restriction portion 76 can be brought into contact with each other.

In the present example, in order to perform sealing between the caliper 2 and the housing 48, a first annular seal 6*a* and a second annular seal 6*b* are disposed between the housing facing surface 25 and the caliper facing surface 66.

In the present example, the first annular seal 6*a* is disposed coaxially with the first spindle 36*a*, and elastically sandwiched in the axial direction between the circular ring surface 27*a* of the housing facing surface 25 and the bottom surface of the annular concave portion 68*a* of the caliper facing surface 66. In addition, the second annular seal 6*b* is disposed coaxially with the second spindle 36*b*, and elastically sandwiched in the axial direction between the circular ring surface 27*b* of the housing facing surface 25 and the bottom surface of the annular concave portion 68*b* of the caliper facing surface 66. As a result, sealing is performed between the caliper 2 and the housing 48.

[Description of Operation of Disc Brake Device]

When the service brake is caused to operate by the disc brake device 1 according to the present example, brake oil is fed to the first cylinder 18*a* and the second cylinder 18*b* through an oil passage (not illustrated). As a result, the first piston 3*a* and the second piston 3*b* are pushed out from the first cylinder 18*a* and the second cylinder 18*b*, and the inner pad 10*b* is pressed against an inner surface in the axial direction of the rotor 11. In addition, the caliper 2 is displaced to the inner side in the axial direction with respect to the support 9 by a reaction force caused by the pressing. Further, the outer pad 10*a* is pressed against an outer surface in the axial direction of the rotor 11 by the pressing portion 20 of the caliper 2. As a result, a braking force is obtained by friction applied to contact surfaces of the outer pad 10*a* and the inner pad 10*b* with the rotor 11. In this way, the disc brake device 1 obtains the braking force caused by the service brake by pushing out the first piston 3*a* and the second piston 3*b* by introducing the brake oil.

When the parking brake is caused to operate by the disc brake device 1, the electric motor 45 constituting the motor gear unit 5 is energized, and the first spindle 36*a* and the second spindle 36*b* are rotationally driven in the forward rotation direction via the deceleration mechanism 46. As a result, the first nut 37*a* and the second nut 37*b* are moved toward the outer side in the axial direction. By pushing out the first piston 3*a* and the second piston 3*b* toward the rotor 11, the inner pad 10*b* is pressed against the inner surface in the axial direction of the rotor 11. In addition, the caliper 2 is displaced to the inner side in the axial direction with respect to the support 9 by a reaction force caused by the pressing. Further, the outer pad 10*a* is pressed against an outer surface in the axial direction of the rotor 11 by the pressing portion 20 of the caliper 2. As a result, a braking force is obtained by friction applied to contact surfaces of the inner pad 10*b* and the outer pad 10*a* with the rotor 11. In this way, the disc brake device 1 obtains the braking force caused by the parking brake by pushing out the first piston 3*a* and the second piston 3*b* using the motor gear unit 5.

In a non-energization state where an engine of an automobile is stopped and energization to the electric motor 45 is stopped, energization to an electromagnetic coil constituting the non-excited operation brake 47 is stopped. Therefore, rotation of the motor shaft 50 can be suppressed by the non-excited operation brake 47. Therefore, the disc brake device 1 according to the present example can maintain the braking force caused by the parking brake even in a state where energization to the electric motor 45 is stopped.

According to the disc brake device 1 of the present example, each of coaxiality between the first spindle 36*a* and the first output shaft 51*a* and coaxiality between the second spindle 36*b* and the second output shaft 51*b* can be ensured, and sealing performance between the caliper 2 and the housing 48 can be ensured.

That is, in the present example, in a state before the housing 48 is fixed to the caliper 2, the circumferential position and the radial position of each of the first caliper-side restriction portion 31 and the first housing-side restriction portion 75 are restricted by bringing the first caliper-side restriction portion 31 and the first housing-side restriction portion 75 into contact with each other. That is, the circumferential positions and the radial positions of the first caliper-side restriction portion 31 and the first housing-side restriction portion 75 are matched, respectively. Further, from this state, the relative rotation position between the caliper 2 and the housing 48 about the central axis $O_{31}$ of the first caliper-side restriction portion 31 serving as a reference point is restricted by bringing the second caliper-side restriction portion 32 and the second housing-side restriction portion 76 into contact with each other. As a result, in the present example, the position (circumferential position, radial position, and relative rotation position) of the housing 48 with respect to the caliper 2 can be strictly restricted.

In addition, in the present example, a position (circumferential position and radial position) of the central axis of each of the first spindle 36*a* and the second spindle 36*b* is restricted with reference to the position of the first caliper-side restriction portion 31, and a position (circumferential position and radial position) of the central axis of each of the first output shaft 51*a* and the second output shaft 51*b* is restricted with reference to the position of the first housing-side restriction portion 75.

Therefore, according to the disc brake device 1 of the present example, each of the coaxiality between the first spindle 36*a* and the first output shaft 51*a* and the coaxiality between the second spindle 36*b* and the second output shaft 51*b* can be ensured. Therefore, it is possible to suppress a decrease in conversion efficiency of the first rotation-linear motion conversion mechanism 4*a* and the second rotation-linear motion conversion mechanism 4*b*. In addition, abnormal wear of each sliding portion can be suppressed. Further, leakage of the brake oil can be suppressed.

In the present example, the first annular seal 6*a* is disposed coaxially with the first spindle 36*a*, and elastically sandwiched in the axial direction between the circular ring surface 27*a* of the housing facing surface 25 and the bottom surface of the annular concave portion 68*a* of the caliper facing surface 66. In addition, the second annular seal 6*b* is disposed coaxially with the second spindle 36*b*, and elastically sandwiched in the axial direction between the circular ring surface 27*b* of the housing facing surface 25 and the bottom surface of the annular concave portion 68*b* of the caliper facing surface 66. Therefore, sealing can be performed between the caliper 2 and the housing 48 by the first annular seal 6*a* and the second annular seal 6*b*. Specifically, it is possible to suppress foreign matter from entering the inner side of the first cylinder 18*a* and the second cylinder 18*b* through the insert-through holes 24*a* and 24*b* open in the housing facing surface 25, and to suppress foreign matter from entering the inner side of the housing 48 through the insertion holes 67*a* and 67 open in the caliper facing surface 66. In particular, in the present example, the first annular seal 6*a* is sandwiched in the axial direction between the circular ring surface 27*a* and the bottom surface of the annular concave portion 68*a*, and is not disposed in a spigot-fitting portion. In addition, the second annular seal 6*b* is sandwiched in the axial direction between the circular ring surface 27*b* and the bottom surface of the annular concave portion 68*b*, and is not disposed in the spigot-fitting portion. Therefore, by ensuring a flatness of each of the circular ring surface 27*a* and the bottom surface of the annular concave portion 68*a* that sandwich the first annular seal 6*a*, and the circular ring surface 27*b* and the bottom surface of the annular concave portion 68*b* that sandwich the second annular seal 6*b*, separately from the matter that the coaxiality between the first spindle 36*a* and the first output shaft 51*a* and the coaxiality between the second spindle 36*b* and the second output shaft 51*b* are ensured, interference of each of the first annular seal 6*a* and the second annular seal 6*b* can be made uniform over the entire circumference, and a degree of freedom in design can be improved.

In the present example, since a part of the reinforcing rib 69 provided in the housing 48 is used as the first housing-side restriction portion 75 and the second housing-side restriction portion 76, an increase in the number of components can be suppressed, and weight reduction of the disc brake device 1 can be achieved.

In the present example, the respective half portions on the inner side in the axial direction of the first caliper-side restriction portion 31 and the second caliper-side restriction portion 32 are inserted and disposed in an inner side of a recessed portion 79 existing between the reinforcing ribs 69 provided on the caliper facing surface 66. Therefore, it is possible to suppress an increase in an axial dimension of the disc brake device 1 due to provision of the position restriction portion 7.

The first caliper-side restriction portion 31 and the second caliper-side restriction portion 32 respectively have the caliper-side restriction surfaces 34*a* and 34*b* having a cylindrical surface shape. Therefore, there is no need to limit a phase when the first caliper-side restriction portion 31 and the second caliper-side restriction portion 32 are inserted into the fixing hole 33, and the assembly cost can be reduced.

In the present example, by utilizing gravity applied to the housing 48, the first caliper-side restriction portion 31 and the first housing-side restriction portion 75 can be brought into contact with each other and the second caliper-side restriction portion 32 and the second housing-side restriction portion 76 can be brought into contact with each other, and thus a contact failure can be suppressed and the number of assembly steps can be reduced. In addition, by utilizing the rotational force when tightening the mounting bolts 74*a* to 74*c*, the first caliper-side restriction portion 31 and the first housing-side restriction portion 75 can be brought into contact with each other or/and the second caliper-side restriction portion 32 and the second housing-side restriction portion 76 can be brought into contact with each other. Also in this case, the number of assembly steps can be reduced.

Second Example of Embodiment

Figure 17:
FIG. 17 is a schematic cross-sectional view of a portion corresponding to a part of FIG. 9, illustrating a second example of the embodiment.
Figure 17:
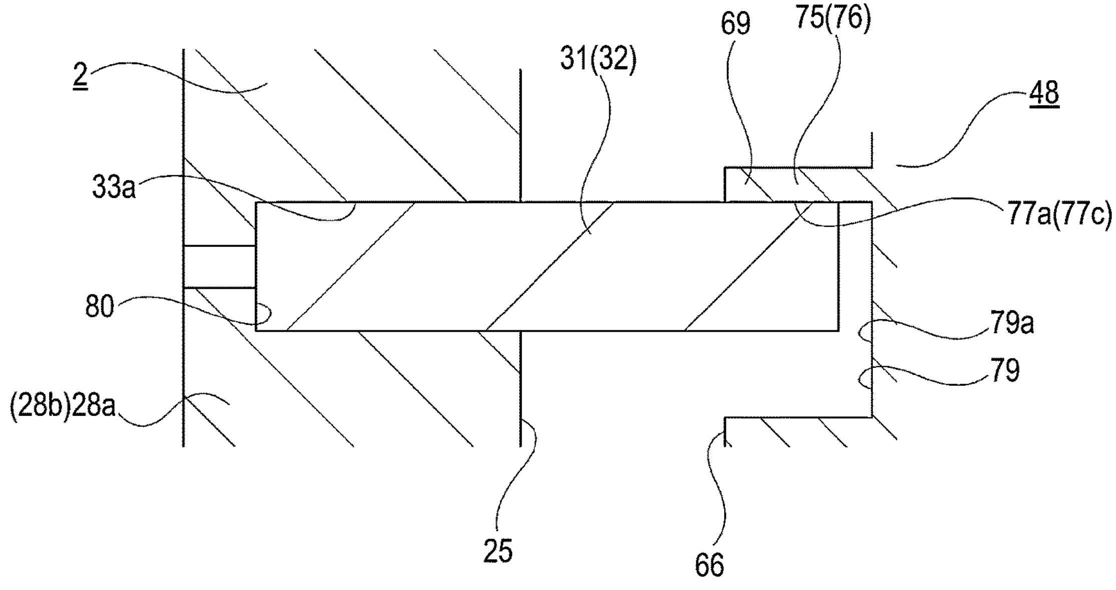

A second example of the embodiment will be described with reference to FIG. 17.

In the present example, a step surface 80 is provided on an inner peripheral surface of a fixing hole 33*a* by changing an inner diameter of the fixing hole 33*a* formed in the caliper 2 stepwise. The end surface at the outer side in the axial direction of the first caliper-side restriction portion 31 (and the second caliper-side restriction portion 32) abuts against the step surface 80. It is also possible to adopt a configuration in which the fixing hole is a blind hole and the end surface of the caliper-side restriction portion abuts against a bottom surface of the fixing hole.

In addition, the end surface at the inner side in the axial direction of the first caliper-side restriction portion 31 (and the second caliper-side restriction portion 32) is made to face a bottom surface 79*a* of the recessed portion 79 provided in a portion between the reinforcing ribs 69 having an oblique lattice shape within the caliper facing surface 66.

As described above, in the present example, the first caliper-side restriction portion 31 (and the second caliper-side restriction portion 32) is sandwiched between the step surface 80 and the bottom surface 79*a* of the recessed portion 79 from both sides in the axial direction.

In the present example as described above, it is possible to effectively suppress the first caliper-side restriction portion 31 (and the second caliper-side restriction portion 32) from coming off from the fixing hole 33*a* in the axial direction by the step surface 80 and the bottom surface 79*a* of the recessed portion 79.

Other configurations, operations, and effects are the same as those of the first example of the embodiment.

Third Example of Embodiment

Figure 18:
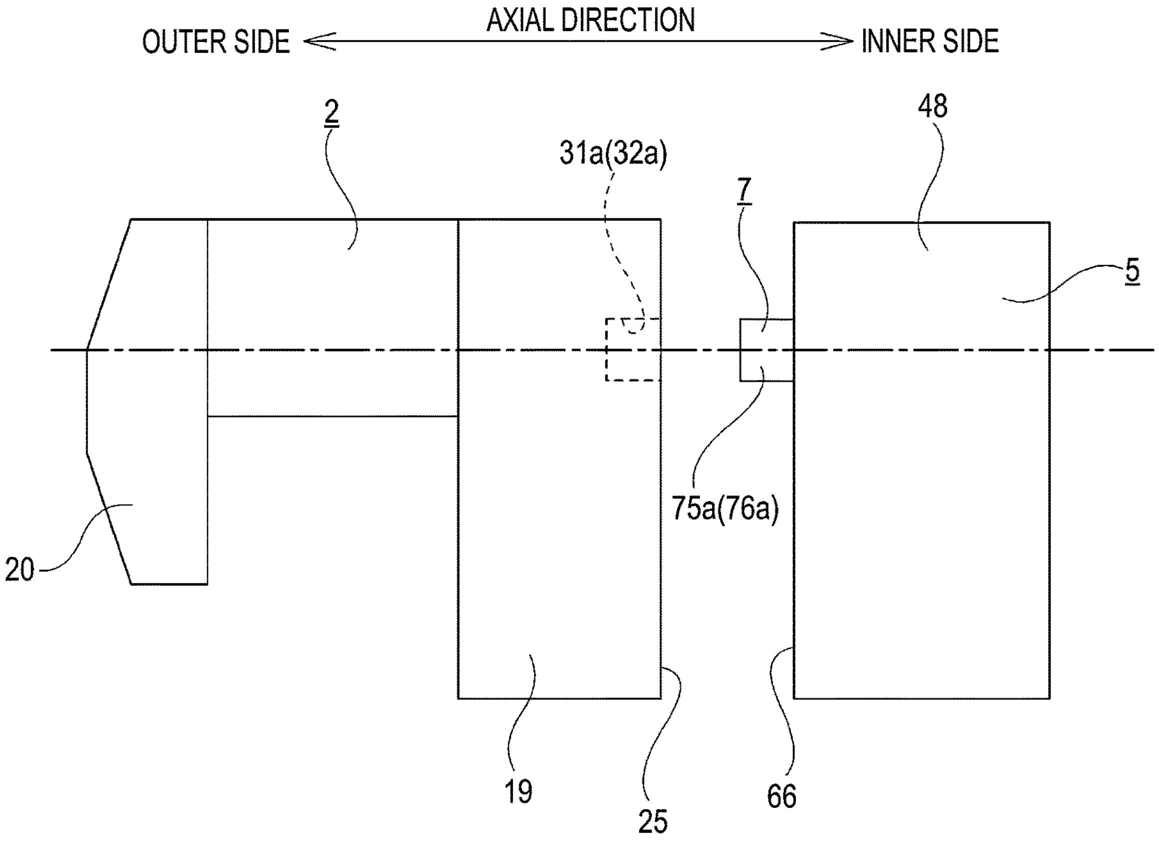
FIG. 18 is a schematic view illustrating a disc brake device according to a third example of the embodiment in a state where the motor gear unit is removed from a caliper.

A third example of the embodiment will be described with reference to FIG. 18.

In the present example, only a structure of the position restriction portion 7 is changed from a structure thereof in the first example of the embodiment. Specifically, each of a first caliper-side restriction portion 31*a* and a second caliper-side restriction portion 32*a* provided on the housing facing surface 25 has a concave shape recessed in the axial direction, and each of a first housing-side restriction portion 75*a* and a second housing-side restriction portion 76*a* provided on the caliper facing surface 66 has a convex shape protruding in the axial direction.

In the present example, each of the first caliper-side restriction portion 31*a* and the second caliper-side restriction portion 32*a* is directly formed with respect to the caliper 2. On the other hand, each of the first housing-side restriction portion 75*a* and the second housing-side restriction portion 76*a* is formed separately from the housing 48 and is formed of a pin member molded and fixed to the housing 48, or is integrally formed with the housing 48.

In the present example as described above, since the first housing-side restriction portion 75*a* and the second housing-side restriction portion 76*a* are pin members molded and fixed to the housing 48, or are integrally formed with the housing 48, cost reduction of the disc brake device 1 can be achieved.

Other configurations, operations, and effects are the same as those of the first example of the embodiment.

Fourth Example of Embodiment

Figure 19:
FIG. 19 is a view corresponding to FIG. 16, illustrating a fourth example of the embodiment.
Figure 19:
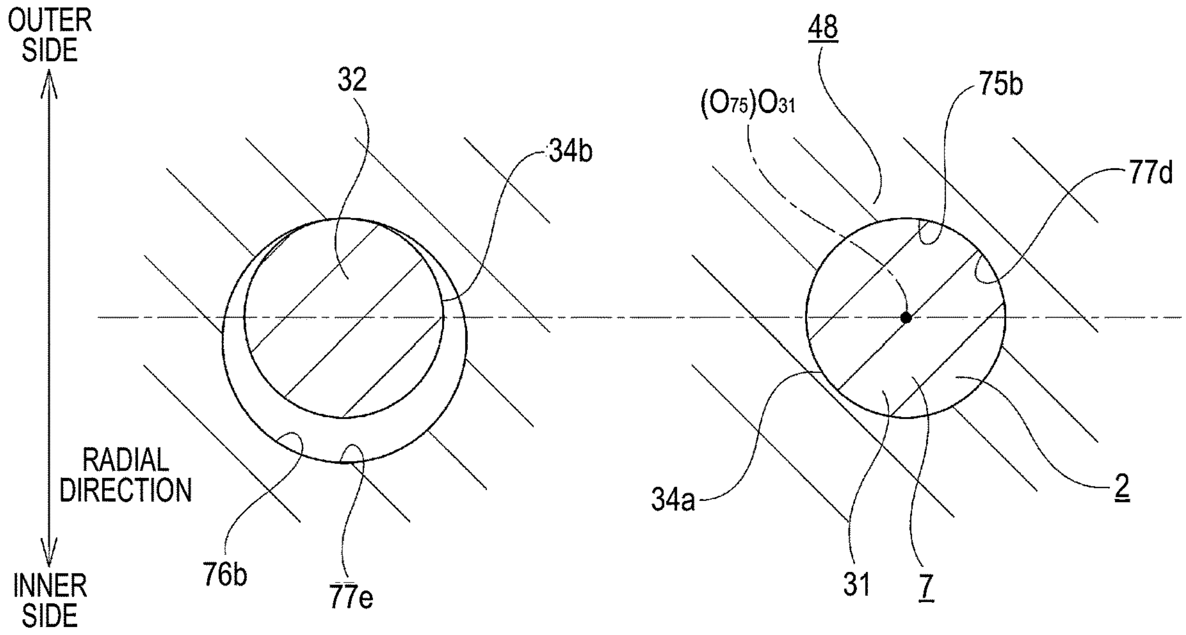

A fourth example of the embodiment will be described with reference to FIG. 19.

In the present example, only a structure of the position restriction portion 7 is changed from a structure thereof in the first example of the embodiment. Specifically, only structures of a first housing-side restriction portion 75*b* and a second housing-side restriction portion 76*b* constituting the position restriction portion 7 are changed from structures thereof in the first example of the embodiment. Structures of the first caliper-side restriction portion 31 and the second caliper-side restriction portion 32 are the same as structures in the first example of the embodiment.

In the present example, each of the first housing-side restriction portion 75*b* and the second housing-side restriction portion 76*b* is a columnar concave portion having a concave shape recessed in the axial direction from the caliper facing surface 66. An inner diameter of the first housing-side restriction portion 75*b* is slightly larger than an outer diameter of the first caliper-side restriction portion 31, and an inner diameter of the second housing-side restriction portion 76*b* is sufficiently larger than an outer diameter of the second caliper-side restriction portion 32.

In the present example, by inserting without rattling, that is, lightly press-fitting the first caliper-side restriction portion 31 into the first housing-side restriction portion 75*b*, a housing-side restriction surface 77*d* having a concave cylindrical surface shape (curved surface shape) provided on the inner peripheral surface of the first housing-side restriction portion 75*b* is brought into contact with the caliper-side restriction surface 34*a* having a convex cylindrical surface shape provided on the outer peripheral surface of the first caliper-side restriction portion 31 over the entire circumference. As a result, a circumferential position and a radial position of each of the first caliper-side restriction portion 31 and the first housing-side restriction portion 75*b* are restricted. In the present example, since the caliper-side restriction surface 34*a* and the housing-side restriction surface 77*d* are brought into contact with each other over the entire circumference, the caliper 2 and the housing 48 are suppressed from moving in parallel in all directions other than rotation about the central axis $O_{31}$ of the first caliper-side restriction portion 31 (or a central axis $O_{75}$ of the first housing-side restriction portion 75*b*).

Further, in the present example, the end portion on the outer side in the radial direction within the caliper-side restriction surface 34*b* provided on the outer peripheral surface of the second caliper-side restriction portion 32 is brought into contact with an end portion on the outer side in the radial direction of a housing-side restriction surface 77*e* having a concave cylindrical surface shape provided on an inner peripheral surface of the second housing-side restriction portion 76*b*. That is, the housing-side restriction surface 77*e* and the caliper-side restriction surface 34*b* are brought into contact with each other in the radial direction. As a result, the relative rotation position between the caliper 2 and the housing 48 about the central axis $O_{31}$ of the first caliper-side restriction portion 31 (or the central axis $O_{75}$ of the first housing-side restriction portion 75*b*) serving as the reference point is restricted. The housing-side restriction surface 77*e* and the caliper-side restriction surface 34*b* can be brought into contact with each other by utilizing gravity applied to the housing 48. In addition, in a case where a configuration in which the end portion on the inner side in the radial direction within the caliper-side restriction surface 34*b* is brought into contact with an end portion on the inner side in the radial direction of the housing-side restriction surface 77*e* is adopted, the housing-side restriction surface 77*e* and the caliper-side restriction surface 34*b* can be brought into contact with each other by utilizing gravity applied to the caliper 2.

In the present example as described above, since the circumferential position and the radial position of each of the first caliper-side restriction portion 31 and the first housing-side restriction portion 75*b* can be restricted only by inserting the first caliper-side restriction portion 31 into the inner side of the first housing-side restriction portion 75*b*, workability of an assembly work can be improved, and the number of assembly steps can be reduced.

Other configurations, operations, and effects are the same as those of the first example of the embodiment.

Fifth Example of Embodiment

A fifth example of the embodiment will be described with reference to FIG. 20.

In the present example, only a structure of a second housing-side restriction portion 76*c* is changed from a structure thereof in the fourth example of the embodiment. The structures of the first caliper-side restriction portion 31, the second caliper-side restriction portion 32, and the first housing-side restriction portion 75*b* are the same as structures thereof in the fourth example of the embodiment.

In the present example, the first reinforcing plate 70*a* constituting the reinforcing rib 69 is used as the second housing-side restriction portion 76*c*. The end portion on the outer side in the radial direction within the caliper-side restriction surface 34*b* on the outer peripheral surface of the second caliper-side restriction portion 32 is brought into contact with a housing-side restriction surface 77*f* having a flat surface shape provided on the second housing-side restriction portion 76*c*. As a result, the relative rotation position between the caliper 2 and the housing 48 about the central axis $O_{31}$ of the first caliper-side restriction portion 31 (or the central axis $O_{75}$ of the first housing-side restriction portion 75*b*) serving as the reference point is restricted. Also in the case of the present example, the housing-side restriction surface 77*f* and the caliper-side restriction surface 34*b* can be brought into contact with each other by utilizing gravity applied to the housing 48.

In the present example as described above, since a part of the reinforcing rib 69 can be used as the second housing-side restriction portion 76*c*, cost can be reduced.

Other configurations, operations, and effects are the same as those of the first example and the fourth example of the embodiment.

Sixth Example of Embodiment

A sixth example of the embodiment will be described with reference to FIG. 21.

In the present example, only a structure of a first housing-side restriction portion 75*c* is changed from a structure thereof in the fifth example of the embodiment. The structures of the first caliper-side restriction portion 31, the second caliper-side restriction portion 32, and the second housing-side restriction portion 76*c* are the same as structures thereof in the fifth example of the embodiment.

In the present example, the first housing-side restriction portion 75*c* is a quadrangular concave portion or a quadrangular hole having a concave shape recessed in the axial direction from the caliper facing surface 66. The first housing-side restriction portion 75*c* has two housing-side restriction surfaces 77*g* and 77*h* each having a flat surface shape on an inner peripheral surface thereof. The two housing-side restriction surfaces 77*g* and 77*h* are connected to each other at a right angle.

In the present example, the end portion on the outer side in the radial direction of the caliper-side restriction surface 34*a* having a convex cylindrical surface shape of the first caliper-side restriction portion 31 is brought into contact with the housing-side restriction surface 77*g* having a flat surface shape of the first housing-side restriction portion 75*c*, and the end portion on the one side in the circumferential direction of the caliper-side restriction surface 34*a* having a convex cylindrical surface shape of the first caliper-side restriction portion 31 is brought into contact with the housing-side restriction surface 77*h* having a flat surface shape of the first housing-side restriction portion 75*c*. As a result, a circumferential position and a radial position of each of the first caliper-side restriction portion 31 and the first housing-side restriction portion 75*c* are restricted.

In the case of the present example as described above, since the first housing-side restriction portion 75*c* is a quadrangular concave portion or a quadrangular hole, the first housing-side restriction portion 75*c* can be more easily formed by injection molding or press working. Accordingly, machining cost of the first housing-side restriction portion 75*c* can be reduced.

Other configurations, operations, and effects are the same as those of the first example and the fifth example of the embodiment.

Seventh Example of Embodiment

Figure 22:
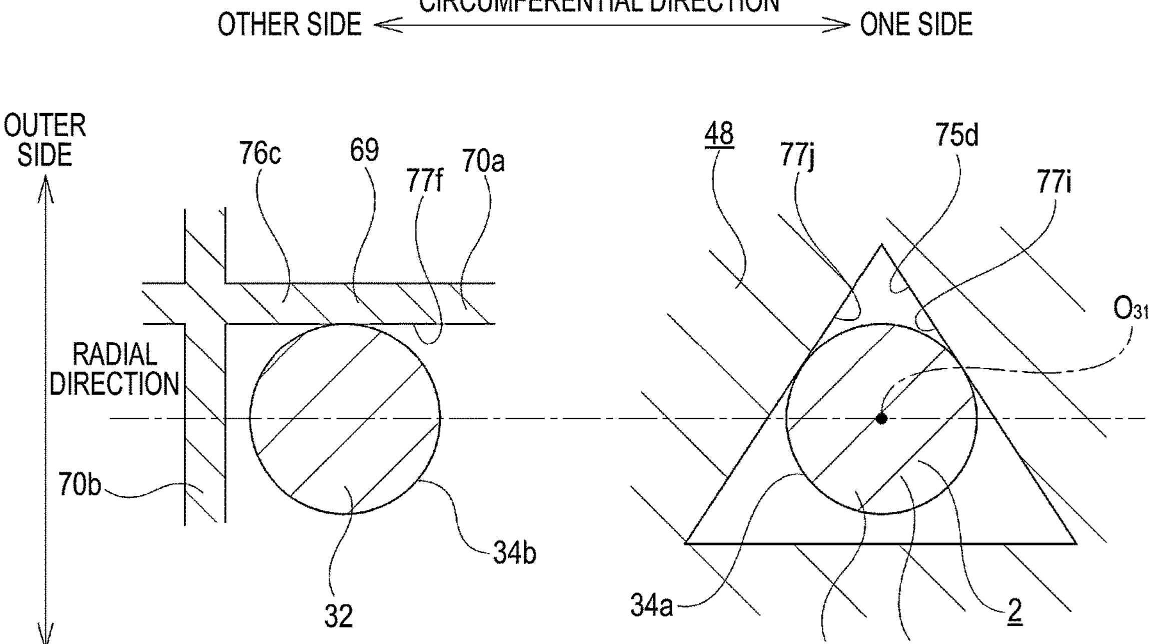
FIG. 22 is a view corresponding to FIG. 16, illustrating a seventh example of the embodiment.

A seventh example of the embodiment will be described with reference to FIG. 22.

Also in the case of the present example, only a structure of a first housing-side restriction portion 75*d* is changed from a structure thereof in the fifth example of the embodiment. The structures of the first caliper-side restriction portion 31, the second caliper-side restriction portion 32, and the second housing-side restriction portion 76*c* are the same as structures thereof in the fifth example of the embodiment.

In the present example, the first housing-side restriction portion 75*d* is a triangular concave portion or a triangular hole having a concave shape recessed in the axial direction from the caliper facing surface 66. The first housing-side restriction portion 75*d* has two housing-side restriction surfaces 77*i* and 77*j* each having a flat surface shape on an inner peripheral surface thereof. The two housing-side restriction surfaces 77*i* and 77*j* are connected to each other such that an included angle is an acute angle.

In the present example, the caliper-side restriction surface 34*a* having a convex cylindrical surface shape of the first caliper-side restriction portion 31 is brought into contact with the two housing-side restriction surfaces 77*i* and 77*j* having a flat surface shape of the first housing-side restriction portion 75*d*. As a result, a circumferential position and a radial position of each of the first caliper-side restriction portion 31 and the first housing-side restriction portion 75*d* are restricted.

In the present example as described above, the housing 48 can be suppressed from moving in the circumferential direction relative to the caliper 2 in a state where the first caliper-side restriction portion 31 is inserted into an inner side of the first housing-side restriction portion 75*d* and the caliper-side restriction surface 34*a* is brought into contact with the two housing-side restriction surfaces 77*i* and 77*j* at the same time. Therefore, the workability of the assembly work can be improved, and the number of assembly steps can be reduced.

Other configurations, operations, and effects are the same as those of the first example and the fifth example of the embodiment.

Eighth Example of Embodiment

Figure 23:
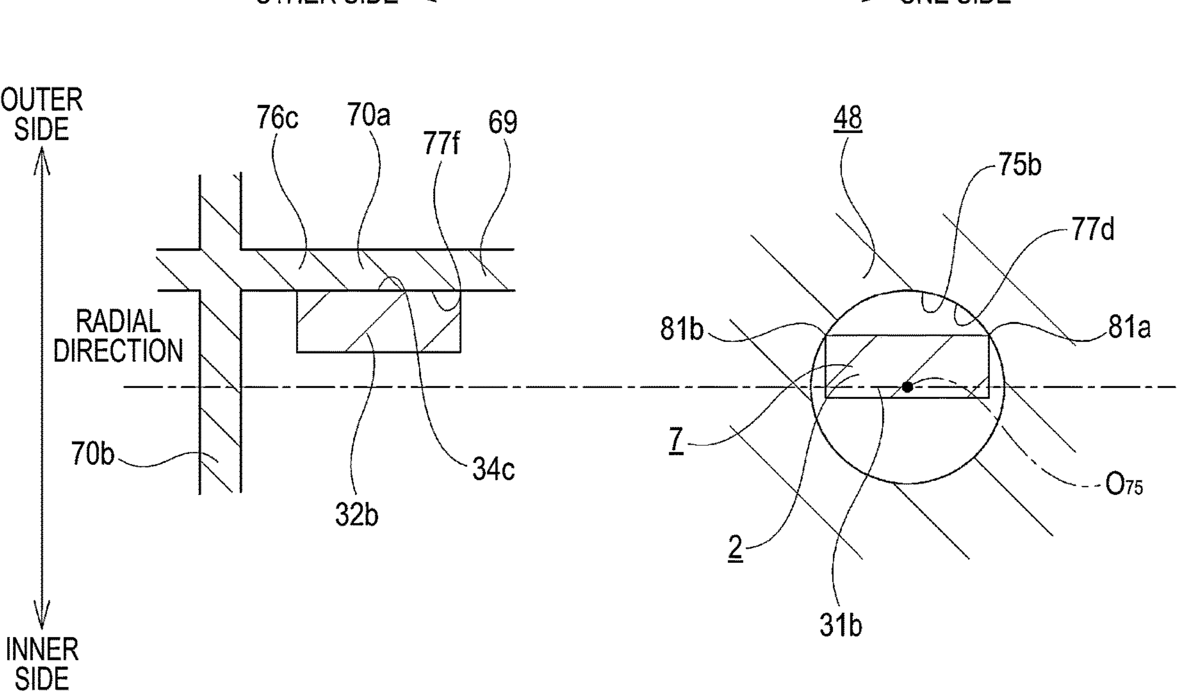
FIG. 23 is a view corresponding to FIG. 16, illustrating an eighth example of the embodiment.

An eighth example of the embodiment will be described with reference to FIG. 23.

Also in the case of the present example, only structures of the first caliper-side restriction portion 31*b* and the second caliper-side restriction portion 32*b* are changed from structures thereof in the fifth example of the embodiment. Structures of the first housing-side restriction portion 75*b* and the second housing-side restriction portion 76*c* are the same as structures thereof in the fifth example of the embodiment.

In the present example, each of the first caliper-side restriction portion 31*b* and the second caliper-side restriction portion 32*b* is a quadrangular prism having a convex shape protruding in the axial direction from the housing facing surface 25. The first caliper-side restriction portion 31*b* includes a caliper-side restriction corner portion 81*a* that connects an outer surface in the radial direction and a side surface on one side in the circumferential direction, and a caliper-side restriction corner portion 81*b* that connects the outer surface in the radial direction and a side surface on the other side in the circumferential direction. On the other hand, the second caliper-side restriction portion 32*b* has a caliper-side restriction surface 34*c* having a flat surface shape on the outer surface in the radial direction.

In the present example, by inserting the first caliper-side restriction portion 31*b* into the first housing-side restriction portion 75*b*, the two caliper-side restriction corner portions 81*a* and 81*b* provided in the first caliper-side restriction portion 31*b* are brought into contact with the housing-side restriction surface 77*d* having a concave cylindrical surface shape provided on the inner peripheral surface of the first housing-side restriction portion 75*b*. As a result, a circumferential position and a radial position of each of the first caliper-side restriction portion 31*b* and the first housing-side restriction portion 75*b* are restricted.

Further, in the present example, the caliper-side restriction surface 34*c* provided in the second caliper-side restriction portion 32*b* is brought into surface contact with the housing-side restriction surface 77*f* having a flat surface shape provided in the second housing-side restriction portion 76*c*. As a result, the relative rotation position between the caliper 2 and the housing 48 around the central axis $O_{75}$ of the first housing-side restriction portion 75*b* serving as a reference point is restricted.

In the present example as described above, since the caliper-side restriction surface 34*c* and the housing-side restriction surface 77*f* are brought into surface contact with each other, the relative rotation position between the caliper 2 and the housing 48 can be strictly restricted.

Other configurations, operations, and effects are the same as those of the first example and the fifth example of the embodiment.

Ninth Example of Embodiment

Figure 24:
FIG. 24 is a view corresponding to FIG. 16, illustrating a ninth example of the embodiment.
Figure 24:
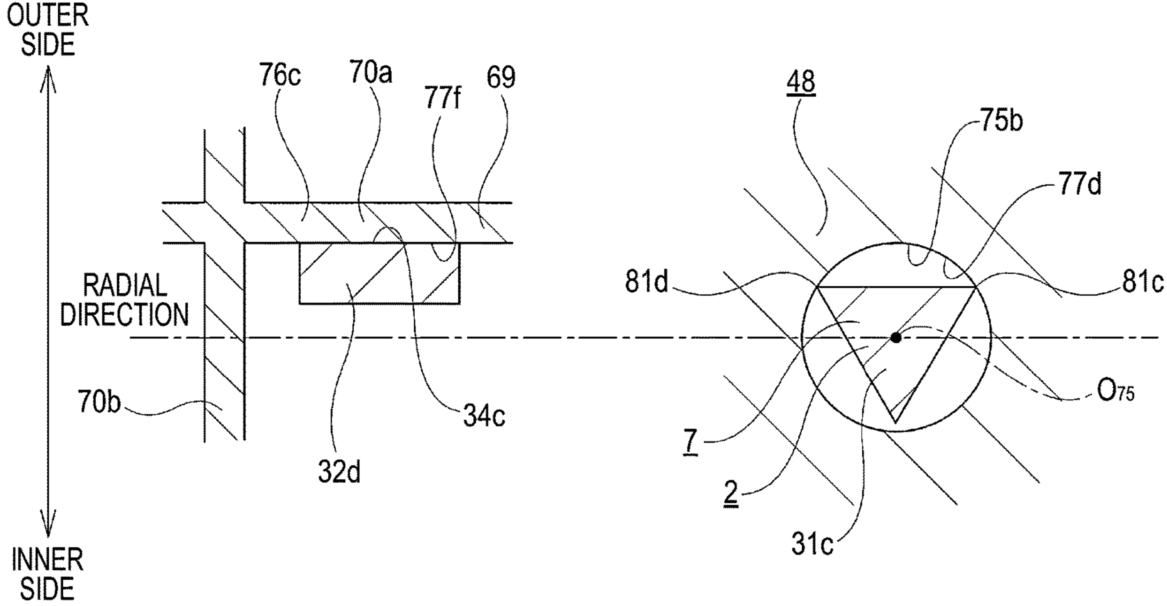

A ninth example of the embodiment will be described with reference to FIG. 24.

In the present example, only a structure of the first caliper-side restriction portion 31*c* is changed from a structure thereof in the eighth example of the embodiment. Structures of the second caliper-side restriction portion 32*b*, the first housing-side restriction portion 75*b*, and the second housing-side restriction portion 76*c* are the same as structures thereof in the eighth example of the embodiment.

In the present example, the first caliper-side restriction portion 31*c* is a triangular prism having a convex shape protruding in the axial direction from the housing facing surface 25. The first caliper-side restriction portion 31*c* includes a caliper-side restriction corner portion 81*c* that connects an outer surface in the radial direction and a side surface on one side in the circumferential direction, and a caliper-side restriction corner portion 81*d* that connects the outer surface in the radial direction and a side surface on the other side in the circumferential direction.

Also in the case of the present example, by inserting the first caliper-side restriction portion 31*c* into the first housing-side restriction portion 75*b*, the two caliper-side restriction corner portions 81*c* and 81*d* provided in the first caliper-side restriction portion 31*c* are brought into contact with the housing-side restriction surface 77*d* having a concave cylindrical surface shape provided on the inner peripheral surface of the first housing-side restriction portion 75*b*. As a result, a circumferential position and a radial position of each of the first caliper-side restriction portion 31*c* and the first housing-side restriction portion 75*b* are restricted.

In the case of the present example, when the first caliper-side restriction portion 31*c* is inserted into the first housing-side restriction portion 75*b*, the remaining corner portions connecting the side surface on the one side in the circumferential direction and the side surface on the other side in the circumferential direction of the first caliper-side restriction portion 31*c* can be lightly brought into contact with the housing-side restriction surface 77*d*. Other configurations, operations, and effects are the same as those of the first example and the eighth example of the embodiment.

Tenth Example of Embodiment

Figure 25:
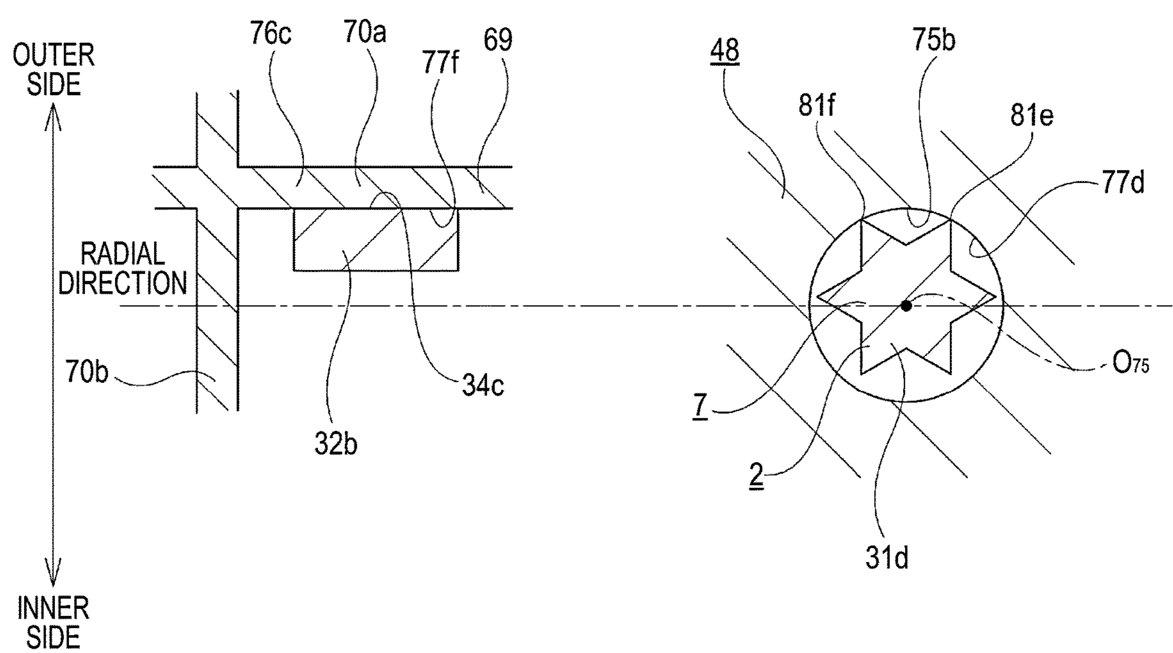
FIG. 25 is a view corresponding to FIG. 16, illustrating a tenth example of the embodiment.
Figure 26:
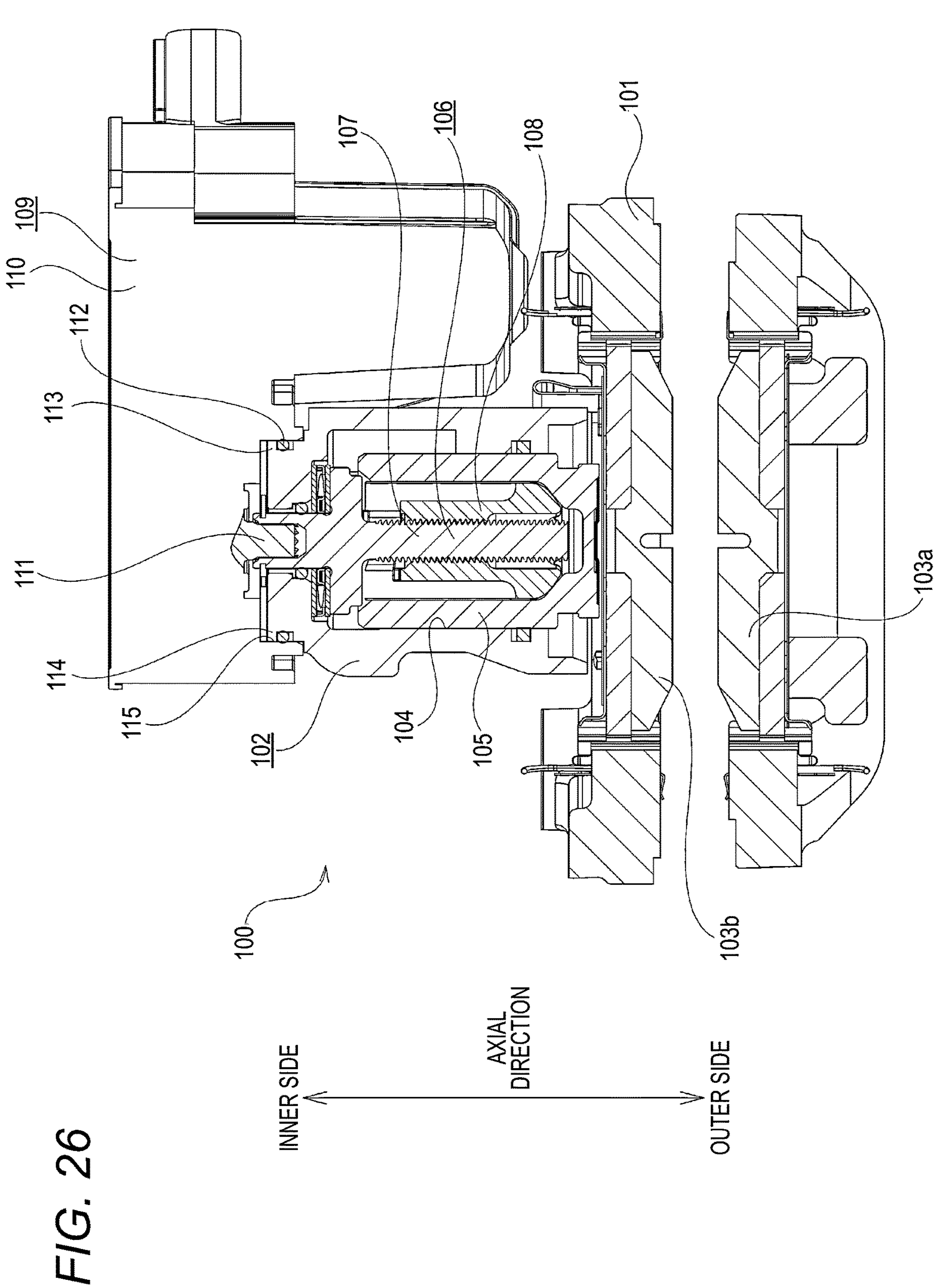
FIG. 26 is a cross-sectional view illustrating a disc brake device of an existing structure.

A tenth example of the embodiment will be described with reference to FIG. 25.

In the present example, only a structure of the first caliper-side restriction portion 31*d* is changed from a structure thereof in the eighth example of the embodiment. Structures of the second caliper-side restriction portion 32*b*, the first housing-side restriction portion 75*b*, and the second housing-side restriction portion 76*c* are the same as structures thereof in the eighth example of the embodiment.

In the present example, the first caliper-side restriction portion 31*d* is a star-shaped prism having a convex shape protruding in the axial direction from the housing facing surface 25.

In the case of the present example, by inserting the first caliper-side restriction portion 31*d* into the first housing-side restriction portion 75*b*, at least two caliper-side restriction corner portions 81*e* and 81*f* provided on the portion on the outer side in the radial direction of the first caliper-side restriction portion 31*d* are brought into contact with the housing-side restriction surface 77*d* having a concave cylindrical surface shape provided on the inner peripheral surface of the first housing-side restriction portion 75*b*. As a result, a circumferential position and a radial position of each of the first caliper-side restriction portion 31*d* and the first housing-side restriction portion 75*b* are restricted.

In the case of the present example, when the first caliper-side restriction portion 31*d* is inserted into the first housing-side restriction portion 75*b*, other corner portions provided on the outer peripheral surface of the first caliper-side restriction portion 31*d* can be lightly brought into contact with the housing-side restriction surface 77*d*.

Other configurations, operations, and effects are the same as those of the first example and the eighth example of the embodiment.

Although the embodiments of the present disclosure have been described above, the structures in the examples of the embodiment can be appropriately combined and implemented as long as no contradiction occurs.

The structures of the caliper-side restriction portion and the housing-side restriction portion constituting the position restriction portion are not limited to the structures shown in each example of the embodiment, and can be appropriately modified.

In each example of the embodiment, a case where the caliper-side restriction portion and the housing-side restriction portion are provided in two each has been described, but the number of the caliper-side restriction portion and the number of the housing-side restriction portion are not limited to two. For example, the caliper-side restriction portion and the housing-side restriction portion may be provided in one each as long as the circumferential position, the radial position, and the relative rotation position can be simultaneously restricted by one caliper-side restriction portion and one housing-side restriction portion. For example, as such a caliper-side restriction portion and housing-side restriction portion, a structure is provided in which one of the caliper-side restriction portion and the housing-side restriction portion is formed in a prismatic shape such as a triangular prism or a quadrangular prism, and the other of the caliper-side restriction portion and the housing-side restriction portion is formed in a prismatic shape concave portion (prismatic hole) such as a triangular concave portion (triangular hole) or a quadrangular concave portion (quadrangular hole), and the caliper-side restriction portion and the housing-side restriction portion are fitted into each other without a gap.

In addition, respective installation positions of the caliper-side restriction portion and the housing-side restriction portion are not limited to the structure shown in each example of the embodiment, and the caliper-side restriction portion and the housing-side restriction portion can be installed at any position of the housing facing surface and the caliper facing surface.

What is claimed is:

1. A disc brake device comprising:

a caliper having a plurality of cylinders on an inner side in an axial direction with respect to a rotor;

a plurality of pistons fitted into the plurality of cylinders, respectively;

a plurality of rotation-linear motion conversion mechanisms that are disposed in the plurality of cylinders, that are configured to push out each of the plurality of pistons toward the rotor by converting a rotational motion into a linear motion, and that include rotation members and linear motion members;

a motor gear unit that is supported and fixed to the caliper and includes an electric motor, a plurality of output members disposed coaxially with the rotation members and configured to transmit rotation of the electric motor to the rotation members, the number of which is the same as the number of the rotation members, and a housing accommodating the electric motor and the plurality of output members;

a plurality of annular seals that are disposed coaxially with the rotation members and configured to perform sealing between the caliper and the housing, the number of which is the same as the number of the rotation members;

a position restriction portion configured to restrict a position of the motor gear unit with respect to the caliper; and a fixing portion configured to fix the caliper and the housing, wherein the annular seals are sandwiched in the axial direction between the caliper and the housing, the position restriction portion includes: at least one caliper-side restriction portion provided on the caliper, which is disposed non-coaxially with the rotation member and is configured to serve as a reference of a position of the rotation member; and at least one housing-side restriction portion provided on the housing, which is disposed non-coaxially with the output member and is configured to serve as a reference of a position of the output member, and is configured to restrict a position of the housing with respect to the caliper by bringing the caliper-side restriction portion and the housing-side restriction portion into contact with each other, and the caliper-side restriction portion has a convex shape protruding in the axial direction.

2. The disc brake device according to claim 1, wherein the caliper-side restriction portion includes at least one caliper-side restriction surface having a curved surface shape or a flat surface shape, the housing-side restriction portion includes at least one housing-side restriction surface having a curved surface shape or a flat surface shape, and the caliper-side restriction portion and the housing-side restriction portion are configured to be brought into contact with each other by the caliper-side restriction surface and the housing-side restriction surface.

3. The disc brake device according to claim 1, wherein one of the caliper-side restriction portion and the housing-side restriction portion includes at least one restriction corner portion, the other of the caliper-side restriction portion and the housing-side restriction portion includes at least one restriction surface having a curved surface shape or a flat surface shape, and the caliper-side restriction portion and the housing-side restriction portion are configured to be brought into contact with each other by the restriction corner portion and the restriction surface.

4. The disc brake device according to claim 1, wherein the caliper-side restriction portion and the housing-side restriction portion are provided in two each.

5. The disc brake device according to claim 4, wherein by bringing a first caliper-side restriction portion of the two caliper-side restriction portions into contact with a first housing-side restriction portion of the two housing-side restriction portions, a circumferential position and a radial position of each of the first caliper-side restriction portion and the first housing-side restriction portion are restricted, and by bringing a second caliper-side restriction portion of the two caliper-side restriction portions into contact with a second housing-side restriction portion of the two housing-side restriction portions, a relative rotation position between the caliper and the housing about a central axis of the first caliper-side restriction portion or the first housing-side restriction portion is restricted.

6. The disc brake device according to claim 5, wherein a contact direction of the second caliper-side restriction portion and the second housing-side restriction portion is a circumferential direction or a radial direction.

7. The disc brake device according to claim 1, wherein the caliper-side restriction portion is formed separately from the caliper, and includes a pin member configured to be fixed to the caliper.

8. The disc brake device according to claim 7, wherein the caliper-side restriction portion is sandwiched and disposed between the caliper and the housing in the axial direction.

9. The disc brake device according to claim 1, wherein the housing-side restriction portion is formed integrally with the housing.

10. The disc brake device according to claim 9, wherein the housing-side restriction portion is provided in a part of a reinforcing rib integrally formed with the housing.

11. The disc brake device according to claim 9, wherein the housing-side restriction portion has a concave shape recessed in the axial direction.

12. The disc brake device according to claim 1, wherein the housing-side restriction portion is formed separately from the housing and includes a pin member configured to be molded and fixed to the housing.

13. The disc brake device according to claim 1, wherein the fixing portion is a bolt.

14. A method for assembling the disc brake device according to claim 1, comprising:

bringing the caliper-side restriction portion and the housing-side restriction portion into contact with each other by utilizing gravity applied to the housing or the caliper.

15. A method for assembling the disc brake device according to claim 13, comprising:

bringing the caliper-side restriction portion and the housing-side restriction portion into contact with each other by utilizing a rotational force applied to the housing or the caliper from the bolt when tightening the bolt.

* * * * *